US009424834B2

(12) United States Patent
Simmons et al.

(10) Patent No.: US 9,424,834 B2
(45) Date of Patent: Aug. 23, 2016

(54) METHOD AND SYSTEM FOR READING FLUENCY TRAINING

(71) Applicant: Rosetta Stone Ltd., Harrisonburg, VA (US)

(72) Inventors: Aaron M. Simmons, Boulder, CO (US); Bryan Pellom, Erie, CO (US); Karl F. Ridgeway, Boulder, CO (US)

(73) Assignee: Rosetta Stone Ltd., Harrisonburg, VA (US)

( * ) Notice: Subject to any disclaimer, the term of this patent is extended or adjusted under 35 U.S.C. 154(b) by 135 days.

(21) Appl. No.: 14/020,385

(22) Filed: Sep. 6, 2013

(65) Prior Publication Data

US 2014/0067367 A1 Mar. 6, 2014

Related U.S. Application Data

(60) Provisional application No. 61/697,521, filed on Sep. 6, 2012.

(51) Int. Cl.
| | |
|---|---|
| *G10L 21/00* | (2013.01) |
| *G10L 15/00* | (2013.01) |
| *G09B 19/04* | (2006.01) |
| *G09B 19/06* | (2006.01) |
| *G09B 17/00* | (2006.01) |
| *G09B 17/02* | (2006.01) |

(52) U.S. Cl.
CPC ........... *G10L 15/005* (2013.01); *G09B 17/003* (2013.01); *G09B 17/02* (2013.01); *G09B 19/04* (2013.01); *G09B 19/06* (2013.01)

(58) Field of Classification Search
USPC .................. 704/7–9, 270–271, 246–252
See application file for complete search history.

(56) References Cited

U.S. PATENT DOCUMENTS

| | | | | |
|---|---|---|---|---|
| 6,188,985 | B1 * | 2/2001 | Thrift | G06F 3/16 |
| | | | | 348/734 |
| 8,060,371 | B1 * | 11/2011 | Schaedler | G10L 15/26 |
| | | | | 704/270.1 |
| 8,126,719 | B1 * | 2/2012 | Jochumson | G10L 15/30 |
| | | | | 704/201 |
| 8,566,102 | B1 * | 10/2013 | Bangalore et al. | 704/270.1 |
| 8,566,103 | B2 * | 10/2013 | He | G10L 15/22 |
| | | | | 704/200 |
| 8,762,152 | B2 * | 6/2014 | Bennett et al. | 704/257 |

(Continued)

OTHER PUBLICATIONS

International Search Report and Written Opinion for International Application No. PCT/US2013/058518, mailed Mar. 21, 2014.

(Continued)

*Primary Examiner* — Leonard Saint Cyr
(74) *Attorney, Agent, or Firm* — Cooley LLP

(57) ABSTRACT

A non-transitory processor-readable medium stores code representing instructions to be executed by a processor. The code causes the processor to receive a request from a user of a client device to initiate a speech recognition engine for a web page displayed at the client device. In response to the request, the code causes the processor to (1) download, from a server associated with a first party, the speech recognition engine into the client device; and then (2) analyze, using the speech recognition engine, content of the web page including text in an identified language to produce analyzed content based on the identified language, where the content of the web page is received from a server associated with a second party. The code further causes the processor to send a signal to cause the client device to present the analyzed content to the user at the client device.

19 Claims, 16 Drawing Sheets

(56) References Cited

U.S. PATENT DOCUMENTS

| | | | |
|---|---|---|---|
| 2001/0049688 A1 | 12/2001 | Fratkina et al. | |
| 2002/0080927 A1* | 6/2002 | Uppaluru | H04M 3/4938 379/88.01 |
| 2003/0046065 A1* | 3/2003 | Jochumson | G09B 19/04 704/211 |
| 2005/0102147 A1* | 5/2005 | Ullrich | G10L 15/30 704/270.1 |
| 2007/0094032 A1* | 4/2007 | Bennett et al. | 704/270.1 |
| 2008/0120342 A1* | 5/2008 | Reed et al. | 707/104.1 |
| 2008/0141180 A1* | 6/2008 | Reed et al. | 715/854 |
| 2011/0184827 A1 | 7/2011 | Hubert | |
| 2011/0208822 A1 | 8/2011 | Rathod | |

OTHER PUBLICATIONS

Adams, M. J., "The Promise of Automatic Speech Recognition for Fostering Literacy Growth in Children and Adults," in International Handbook of Literacy and Technology. vol. 2, M. McKenna, L. Labbo, R. Kieffer, and D. Reinking, Eds. Hillsdale, NJ: Lawrence Erlbaum Associates, pp. 109-128, 2005.

Adams, M. J., "Technology for Developing Children's Language and Literacy: Bringing Speech Recognition to the Classroom," report prepared for the Joan Ganz Cooney Center by Marilyn Jager Adams, 2011.

Beattie, V. L., "Scientific Learning Reading Assistant™: CMU Sphinx Technology in a Commercial Educational Software Application," Scientific Learning Corporation, 2010.

Beck, J. E. et al., "Automatically Assessing Oral Reading Fluency in a Computer Tutor that Listens," Technology, Instruction, Cognition and Learning, vol. 1, pp. 61-81, 2004.

Hagen, A. et al., (2007), "Highly accurate children's speech recognition for interactive reading tutors using subword units," Speech Communication, vol. 49, pp. 861-873, 2007.

Hosom, J.-P., Ph.D. In Computer Science & Engineering Oregon Graduate Institute of Science & Technology (OGI), Center for Spoken Language Understanding (CSLU), Beaverton, OR (2000). Thesis: Automatic Time Alignment of Phonemes Using Acoustic-Phonetic Information. May 2000.

Mostow, J. et al., "A Prototype Reading Coach that Listens [AAAI-94 Outstanding Paper]," in Proceedings of the Twelfth National Conference on Artificial Intelligence, Seattle, WA, vol. 2, pp. 785-792, 1994.

Mostow, J. et al. (2002) "Predicting Oral Reading Miscues," in Proceedings of the Seventh International Conference on Spoken Language Processing (ICSLP-2002), Denver, CO, pp. 1221-1224., Sep. 16-20, 2002.

National Institute of Child Health and Human Development. Report of the National Reading Panel. Teaching children to read: An Evidence-Based Assessment of the Scientific Research Literature on Reading and Its Implications for Reading Instruction (NIH Publication No. 00-4769). Washington, DC: U.S. Government Printing Office., Apr. 2000.

Siivola, V. et al., "Language Identification for Text Chats," $12^{th}$ Annual Conference of the International Speech Communication Association, 2011.

Taylor, P., Text-to-Speech Synthesis, Cambridge University Press, ISBN 9780521899277, 2009.

"Imagine a Web Designed for Readers." Learn More | Readability: Enjoy Reading. Support Writing, Aug. 14, 2012. http://readability.com/learn-more.

About | Readability. The Readability Story, Aug. 14, 2012. http://readability.com/about.

FAQ | Readability. Frequently Asked Questions, Aug. 15, 2012. http://readability.com/faq.

Kohlachutter, et al. "Boilerplate Detection using Shallow Text Features" WSDM'10, Feb. 4-6, 2010, New York City, New York, USA. Copyright 2010 ACM http://code.google.com/p/boilerpipe/.

"ELO Rating System." Wikipedia. Wikimedia Foundation, Aug. 29, 2012. http://en.wikipedia.org/wiki/Elo_rating_system, 17 pages.

* cited by examiner

Bookmarklet 1380

FIG. 13

METHOD AND SYSTEM FOR READING FLUENCY TRAINING

CROSS-REFERENCE TO RELATED APPLICATIONS

This application claims priority to and the benefit of U.S. Provisional Application No. 61/697,521, filed Sep. 6, 2012, entitled "Method and System for Oral Reading Fluency Training," the disclosure of which is incorporated by reference herein in its entirety.

BACKGROUND

Some embodiments described herein relate generally to language instruction, and, in particular, to a system and method for delivering on-demand oral practiced reading exercises.

Fluency is a fundamental part of the language learning process. It relates to being able to read quickly and effortlessly while imparting the right expression and emotion on words. Practiced oral reading with feedback from human instructors can provide pedagogical benefit for those learning a first language and improve fluency for second language learners as well. Children often practice reading text aloud as part of early literacy curricula. Often, the learner will read out loud while a human teacher listens. The human teacher provides instructional feedback that helps the learner to decode words, and coaches on reading strategies (e.g., sounding out of words) that lead to fluency improvements. While practiced oral reading with feedback from human instructors is known to be beneficial, the lack of availability of human coaches and language educators has led to the development of systems that incorporate computer speech recognition feedback.

Some known systems have been developed to provide practiced oral reading exercises by incorporating computer speech recognition feedback. In such known systems, a computer typically plays the role of a human instructor to actively listen as a learner reads text aloud, to track the location of the spoken words on a computer screen, and to provide various forms of visual and/or audible feedback when errors are detected. Such known systems, however, typically require heavy preprocessing of audio and text content including manual crafting, alignment and/or synchronization of the audio and text content in advance, which can be labor-intensive and often require intervention from human editors. Furthermore, some known systems can require extensive installation of components (e.g., the software solution itself, the content, as well as the computer speech recognition system), thus making them inconvenient to use and difficult to update and maintain.

Accordingly, a need exists for a system and method that can enable oral reading exercises to deliver practice and instructional feedback to a language learner without human intervention, heavy preprocessing or extensive installation of components.

SUMMARY

In some embodiments, a non-transitory processor-readable medium stores code representing instructions to be executed by a processor. The code causes the processor to receive a request from a user of a client device, where the request is to initiate a speech recognition engine for a web page that is displayed at the client device. Content of the web page is received from a server. The content of the web page includes text in a language that can be identified. In response to the request, the code causes the processor to download the speech recognition engine from another server to the client device. The code causes the processor to analyze, using the speech recognition engine, the content of the web page based on the identified language. As a result of the analyzing, analyzed content is produced based on the content of the web page. The code causes the processor to send a signal to cause the client device to present the analyzed content to the user at the client device. The code can enable real-time or substantially real-time visual highlighting of text in synchronization with audio. The code can also analyze the user's voice and provide fluency feedback to the user.

BRIEF DESCRIPTION OF THE DRAWINGS

FIG. 13 is a screen shot that illustrates injecting a speech recognition engine into a web browser using a bookmarklet, according to an embodiment.

DETAILED DESCRIPTION

Figure 1:
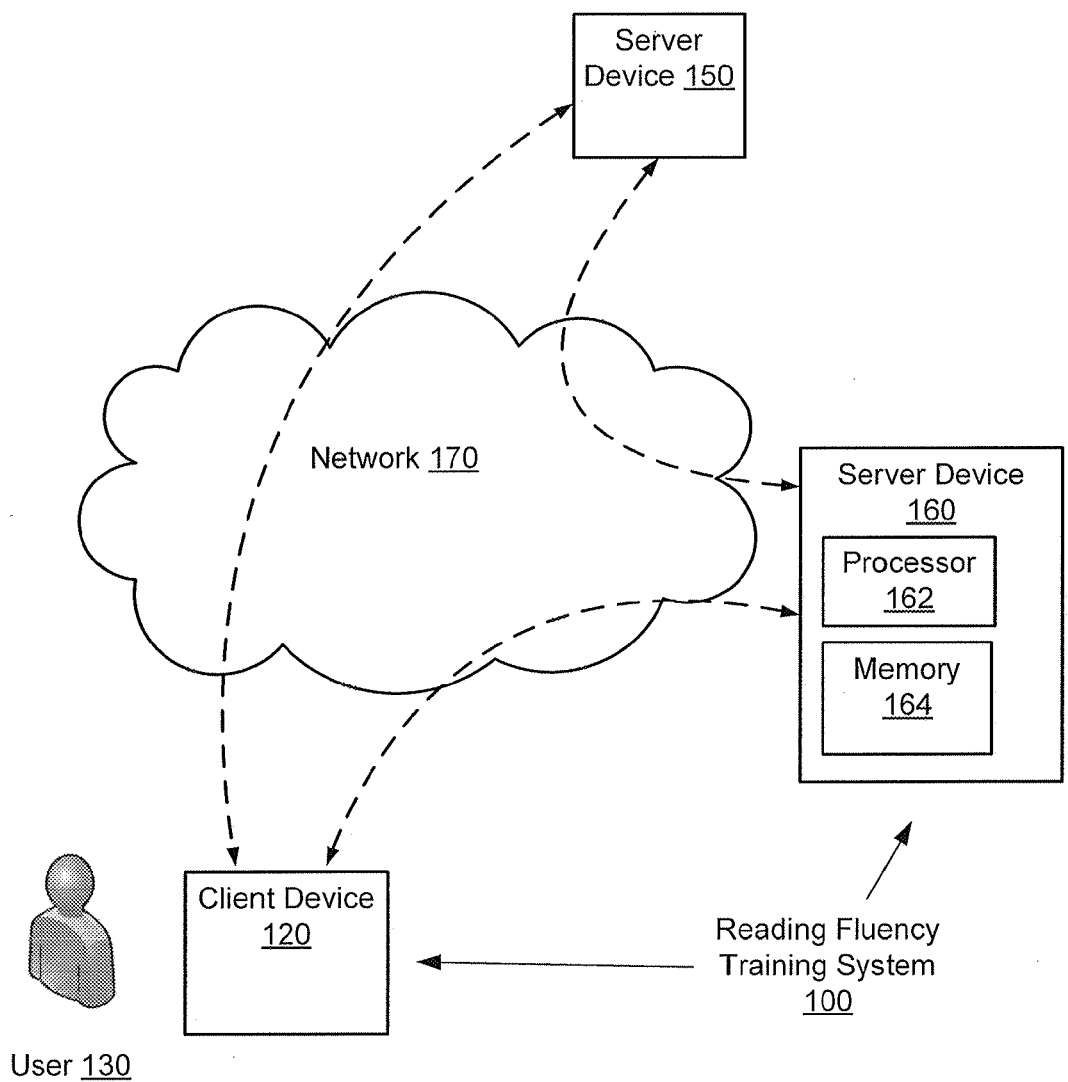
FIG. 1 is a schematic diagram illustrating a reading fluency training system, according to an embodiment.

In some embodiments, a fluency training system can provide on-screen visual highlighting of words, sentences, and/or lines of text within the context of a document (e.g., a HyperText Markup Language (HTML) document) where the highlighting is manipulated by oral reading. The highlighting can be performed in real-time (or substantially real-time) as a learner speaks the text of the document, or via prerecorded audio discovered as related to the document's article content. The system can allow language learners to listen to text-synchronized audio recordings on the document and observe visual highlighting as audio is played. Learners using a web browser or mobile device can actively read the article text contained in the document aloud and observe their voice tracked on the viewable page.

A tracking component of the system can provide a combination of real-time (or substantially real-time) word, sentence, and/or line level highlighting. In addition to providing real-time reading position tracking on a web page, the system can also provide fluency feedback along a number of dimensions including, for example, reading rate, slowly spoken words, disfluent word locations, unnatural pause locations, and/or the like. The instruction method can also include the ability to discover audio linked within a document and provide similar visual highlighting in synchronization with the audio, and/or allow for recordings from other learners or reading experts (e.g., stored in a database or embedded as a link in a web page) to be played in synchrony with the text discovered within the document.

In some embodiments, a non-transitory processor-readable medium stores code representing instructions to be executed by a processor. The code includes code to cause the processor to receive a request from a user of a client device to initiate a speech recognition engine for a web page displayed at the client device. The speech recognition engine can be, for example, part of a reading fluency training system.

The non-transitory processor-readable medium stores code to cause the processor to download, in response to the request and from a first server, the speech recognition engine to the client device. The first server can be, for example, a server device configured to store the speech recognition engine (e.g., code or script of the speech recognition engine) such that any client device requesting the speech recognition engine can download the speech recognition engine from the server device. In some instances, the speech recognition engine is not executed at the first server. In some instances, the non-transitory processor-readable medium stores code to cause the processor to download, via a network and into a browser module at the client device, the speech recognition engine using a bookmarklet. In such instances, the browser module can be configured to present the web page at the client device. Furthermore, the request from the user can include an instruction by the user to initiate the bookmarklet when the web page is presented by the browser module.

The non-transitory processor-readable medium also stores code to cause the processor to analyze, using the speech recognition engine and in response to the request, content of the web page to produce analyzed content. In some instances, the content of the web page includes text in an identified language. In such instances, the content of the web page can be analyzed based on the identified language. Additionally, the content of the web page can be received at the speech recognition engine from a second server. The second server can be, for example, a web server configured to host the web page. Such a second server can be associated with a party (e.g., an organization owning or providing the web page) different from a party associated with the first server (e.g., a company owning or providing the speech recognition engine or at least part of the reading fluency training system). In some instances, the first server can be remote from the second server and the client device.

The non-transitory processor-readable medium further stores code to cause the processor to send a signal to cause the client device to present the analyzed content to the user at the client device. In some instances, the content of the web page includes text associated with audio in the identified language. The code to cause the processor to analyze includes code to cause the processor to map a set of spoken words from the audio of the web page to a set of textual words from the text of the web page. As a result, the signal is configured to cause the client device to visually highlight, at a display screen of the client device, each word from the set of textual words when an associated spoken word from the set of spoken words is output at an audio output device.

In some instances, the content of the web page includes text associated with audio in the identified language. In such instances, the non-transitory processor-readable medium can store code to cause the processor to map a set of spoken words from the audio of the web page to a set of textual words from the text of the web page. As a result of the mapping, the signal can be configured to cause the client device to visually highlight, at a display screen of the client device, each word from the set of textual words when an associated spoken word from the set of spoken words is output at an audio output device (e.g., speaker) associated with the client device.

In some instances, the code to cause the processor to analyze the content of the web page is not executed outside the client device. In some instances, the speech recognition engine utilizes an acoustic model and/or a pronunciation lexicon for the identified language of the text to analyze the content of the web page. In some instances, the code to cause the processor to analyze is not executed prior to the request from the user of the client device.

In some embodiments, a method includes receiving content of a web page at a speech recognition engine on a client device in response to a request from a user at the client device to execute the speech recognition engine. The content of the web page includes text in an identified language being taught to the user. The web page is presented to the user on a display screen of the client device. In some embodiments, the speech recognition engine is part of a reading fluency training system.

The method includes determining, via the speech recognition engine, a set of character indices related to the text of the web page when the web page is presented to the user at the client device. In some instances, each character index from the set of character indices can be a plain text character index.

The method also includes mapping, via the speech recognition engine, a set of spoken words to a set of textual words in the text of the web page based on the set of character indices. The mapping occurs when the web page is presented to the user at the client device. The set of textual words is associated with the content of the web page. In some instances, the method can include defining a data structure configured to map the set of character indices to a set of Document Object Model (DOM) element indices associated with the web page.

The method further includes sending a signal to cause the client device to visually highlight, on the display screen presenting the web page, each word from the set of textual words when an associated spoken word from the set of spoken words is output at or produced by an audio device associated with the client device. In some instances, the mapping can include identifying, via the speech recognition engine, each spoken word from the set of spoken words as that spoken word is output at or produced by the audio device.

In some instances, the set of spoken words are produced by the user in real-time (or substantially real-time), and the audio device is an audio input device such as, for example, a microphone. In such instances, the sending includes sending the signal to cause the client device to visually highlight, on the display screen presenting the web page, each word from the set of textual words when the user produces an associated spoken word from the set of spoken words using the audio device associated with the client device. In some other instances, the set of spoken words are from an audio recording, and the audio device is an audio output device such as, for example, a computer speaker. In such instances, the sending includes sending the signal to cause the client device to visually highlight, on the display screen presenting the web page, each word from the set of textual words when an associated spoken word from the set of spoken words in the audio recording is output at the audio device of the client device.

In some embodiments, a method includes receiving a request from a user of a client device to execute, at the client device, a speech recognition engine for a web page when the web page is displayed at the client device. The web page is hosted by a first server. The web page includes text in a language being taught to the user. The method also includes receiving, at the speech recognition engine, an audio file associated with the content of the web page from a database maintained at a second server in response to the receiving the request. The second server can be associated with a party (e.g., a company owning or providing the speech recognition engine) different from a party associated with the first server (e.g., an organization owning or providing the web page). The audio file is linked to the web page by the database and includes a set of spoken words in the language corresponding, at least in part, to the text of the web page. The method further includes sending a signal to cause the client device to output an audio recording from the audio file as the speech recognition engine processes, at the client device, the text of the web page and the audio file.

As used herein, a module can be, for example, any assembly and/or set of operatively-coupled electrical components associated with performing a specific function, and can include, for example, a memory, a processor, electrical traces, optical connectors, software (stored and/or executing in hardware), and/or the like. In some embodiments, a module described herein can be a hardware-based module (e.g., a CPU, a general purpose processor, a DSP (Digital Signal Processor), a FPGA (Field Programmable Gate Array), an ASIC (Application Specific Integrated Circuit)), a software-based module (e.g., a module of computer code stored in memory and/or executed at a processor), and/or a combination of hardware and software-based modules.

As used herein, the singular forms "a," "an" and "the" include plural referents unless the context clearly dictates otherwise. Thus, for example, the term "a text processing module" is intended to mean a single module or a combination of modules configured to perform functions associated with processing text content of a web page.

FIG. 1 is a schematic diagram that illustrates a reading fluency training system 100, according to an embodiment. In some embodiments, a reading fluency training system can also be referred to as, for example, a web-content oral fluency trainer, a web-content reading fluency trainer, an oral reading fluency training system, an oral reading fluency trainer, and/or the like. As shown in FIG. 1, the reading fluency training system 100 includes a client device 120 and a server device 160. The client device 120 is in communication with the server device 160 and another server device 150 via a network 170. The network 170 can be any type of network (e.g., a local area network (LAN), a wide area network (WAN), a virtual network, a telecommunications network, a cellular network, a wireless LAN (WLAN), etc.) configured to enable communication between the client device 120 and the server devices 150, 160. The network 170 can be implemented as a wired network and/or wireless network. In some embodiments, the network 170 can be, for example, the Internet.

The client device 120 can be any type of device configured to send data over the network 170 to and/or receive data from one or more of other devices (e.g., the server devices 150, 160). The client device 120 can be operated by a user 130, and operatively coupled to the network 170 such that the client device 120 can be in communication with the server devices 150, 160. The user 130 can be anyone that operates the client device 120. The user 130 can be anyone (e.g., a language learner, a teacher, a tutor, a researcher, etc.) that uses the reading fluency training system 100. In some embodiments, the client device 120 can be, for example, a desktop computer, a laptop, a smart phone, a tablet, and/or the like. Details of a client device are further illustrated and described with respect to FIG. 2.

The server device 150 can be any device configured to host and provide a web page such that the client device 120 can retrieve and display content of the web page. In some embodiments, the server device 150 can be configured to function as, for example, a web server, a network management device, a data repository, and/or the like. For example, the server device 150 can be a web server that hosts and maintains a website including one or multiple web pages. The client device 120 can be a personal computer connected to the server device 150 via an Internet Service Provider (ISP) and the Internet (e.g., the network 170). Thus, the client device 120 can retrieve content of the web page(s) and display the web page(s) on a monitor of the client device 120. In some embodiments, although not shown in FIG. 1, the client device 120 can connect to and retrieve web pages from more than one server device. For example, the client device 120 can be a computer connected to the Internet (e.g., the network 170) such that the client device 120 can access and display other web pages available on the Internet. As such, the server device 150 can be maintained by a third-party (e.g., a website host, an entity owning or providing a website) that is not associated with the reading fluency training system 100.

The server device 160 can be any device configured to host and execute a portion of the reading fluency training system 100. As shown in FIG. 1, the server device 160 can be operatively coupled to the client device 120 and the server device 150 via the network 170 (e.g., the Internet). The server device 160 includes a processor 162 and a memory 164. The memory 164 can be, for example, a random access memory (RAM) (e.g., a dynamic RAM, a static RAM), a memory buffer, a hard drive, an erasable programmable read-only memory (EPROM), an electrically erasable read-only memory (EEPROM), a read-only memory (ROM), and/or so forth. In some embodiments, the memory 164 can store data associated with providing oral reading training exercises to language learners. Such data can include, for example, acoustic models, pronunciation lexicons, user profile information (e.g., username, password, learning language, native language, fluency level, etc.), history information related to audio recordings of a user, metrics associated with learner fluency on each article read, and/or the like. In such embodiments, the server device 160 is configured to add, remove and/or update the data stored in the server device 160. Furthermore, the server device 160 can be configured to process data (e.g., by the processor 162) and/or generate previews (e.g., stored in the memory 164) associated with providing oral reading training exercises. In some embodiments, the memory 164 stores instructions to cause the processor 162 to execute modules, processes and/or functions associated with providing oral reading training exercises to language learners.

The processor 162 can be any suitable processing device configured to run and/or execute modules, processes and/or functions associated with providing oral reading training exercises to language learners. In some embodiments, the processor 162 can be a general purpose processor, a FPGA, an ASIC, a DSP, and/or the like.

In some embodiments, the server device 160 can be configured to function as, for example, a server, a controller, a management device, a database, etc., of the reading fluency training system 100. The client device 120 can be configured to host and execute another portion of the reading fluency training system 100, and to interact with the server device 160 to provide oral reading training exercises to a user (e.g., the user 130). In such embodiments, the server device 160 can be configured to, among other functions, retrieve content of a web page from a remote device (e.g., the server device 150), analyze content of a web page, identify a language from text extracted from a web page, store acoustic model(s) and/or pronunciation lexicon(s), and/or the like. Details of the functions of the server device 160 and the client device 120 are further described with respect to FIG. 2. In some embodiments, the portion of the reading fluency training system 100 hosted and executed at the server device 160 can be referred to as the back-end portion of the reading fluency training system 100, and the portion of the reading fluency training system 100 hosted and executed at the client device 120 can be referred to as the front-end portion of the reading fluency training system 100.

In some embodiments, the reading fluency training system 100 can be configured to enable a method for providing practiced oral reading instructions from textual content found commonly in the form of web pages (e.g., HTML-based web pages). Such a method can, for example, use computer speech recognition mechanisms to provide speech analysis and feedback. Specifically, the reading fluency training system 100 can directly manipulate the content (e.g., HTML-based content) of a web page (or other document) to visually inform a language learner in various ways. In some embodiments, for example, text on the page can be highlighted in synchronization with spoken-word audio. This method allows web content to be orally presented to the language learner with word-based highlighting. Audio can be prerecorded (e.g., linked as a resource to a web page or stored in a database). In other embodiments, the language learner can practice speaking the text presented on the web page by recording live from an audio input device (e.g., a microphone) and to receive visual feedback of reading position. In still other embodiments, the reading fluency training system 100 can manipulate the content on a web page after reading is completed to illustrate various fluency-related feedback mechanisms (e.g., highlighting words on the web page that were read too slowly, not read by the language learner, or mispronounced, etc.). The reading fluency training system 100 and its teaching methods can therefore be used to improve the language learner's reading fluency.

Figure 2:
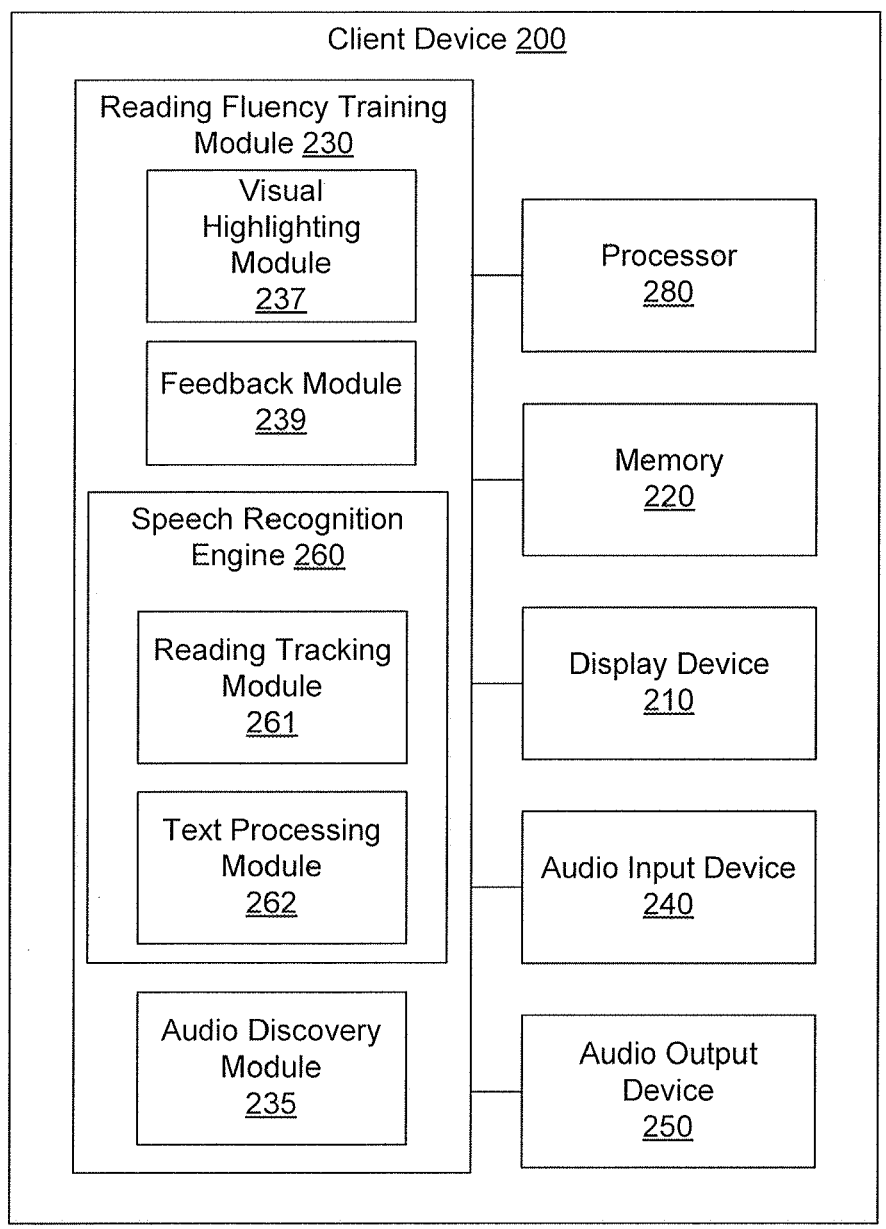
FIG. 2 is a block diagram of a client device within a reading fluency training system, according to an embodiment.

FIG. 2 is a block diagram of a client device 200, according to an embodiment. The client device 200 can be similar to the client device 120 shown and described with respect to FIG. 1. Particularly, the client device 200 can be configured to host and execute a portion of the reading fluency training system (e.g., the reading fluency training system 100 in FIG. 1) described herein. As shown in FIG. 2, the client device 200 includes a processor 280, a memory 220, a display device 210, an audio input device 240, an audio output device 250 and a reading fluency training module 230. The reading fluency training module 230 shown in FIG. 2 and described herein represents a portion of a reading fluency training system (e.g., the reading fluency training system 100 in FIG. 1) that is stored and executed at the client device 200. Another portion of the reading fluency training system can be stored and executed at, for example, a server device (e.g., the server device 160 in FIG. 1, not shown in FIG. 2) operatively coupled to the client device 200. In other embodiments, however, all of the reading fluency training system is stored and executed at the client device 200 as reading fluency training module 230. In some embodiments, the client device 200 can include more or less components than those shown in FIG. 2. For example, the client device 200 can include an input device such as a mouse or a keyboard (not shown in FIG. 2), but not the audio input device 240 (e.g., a microphone).

The memory 220 can be, for example, a RAM (e.g., a dynamic RAM, a static RAM), a memory buffer, a hard drive, a flash memory, an EPROM, an EEPROM, a ROM, and/or so forth. In some embodiments, the memory 220 can be configured to store instructions to cause the processor 280 to execute modules, processes, functions, and/or the like, associated with the reading fluency training module 230 as described in further detail herein.

The processor 280 can be any suitable processing device configured to run and/or execute the modules, processes and functions associated with the reading fluency training module 230. More specifically, as described in further detail herein, the processor 280 can be configured to execute the modules included in the reading fluency training module 230 (e.g., speech recognition engine (SRE) 260 including reading tracking module 261 and text processing module 262, audio discovery module 235, visual highlighting module 237, feedback module 239). In some embodiments, the processor 280 can be a general purpose processor, a FPGA, an ASIC, a DSP, and/or the like.

The display device 210 can be any suitable device configured to display a web page. The display device 210 can be, for example, a monitor (e.g., a liquid crystal display (LCD) monitor, a cathode ray tube display (CRT) monitor, a tablet monitor), a screen, a projector, and/or the like. The audio input device 240 can be any suitable device configured to receive and store (e.g., record) audio input such as, for example, a microphone, a voice recorder, and/or the like. The audio output device 250 can be any suitable device configured to output audio recordings such as, for example, a speaker, an audio card, and/or the like.

To execute the reading fluency training system, the client device 200 can be configured to implement the reading fluency training module 230. In some embodiments, the reading fluency training module 230 (including the SRE 260) can be instantiated at the client device 200 without installing extra software at the client device 200. That is, a user (e.g., the user 130 in FIG. 1) of the client device 200 is not required to perform software installation at the client device 200 in order to use the reading fluency training system. In some embodiments, the reading fluency training module 230 can be instantiated at the client device 200 by, for example, code injection (e.g., JavaScript injection). This method allows the reading fluency training module 230 to be automatically injected as application code into the current web page displayed at the client device 200 (e.g., via the display device 210). Specifically, the application code (e.g., JavaScript) of the reading fluency training module 230 can be inserted into and executed within the code or script (e.g., HTML script) of the web page. In such embodiments, code injection (e.g., JavaScript injection) can be accomplished by, for example, using a web browser add-on, via a bookmarklet, or any other suitable method.

Figure 7:
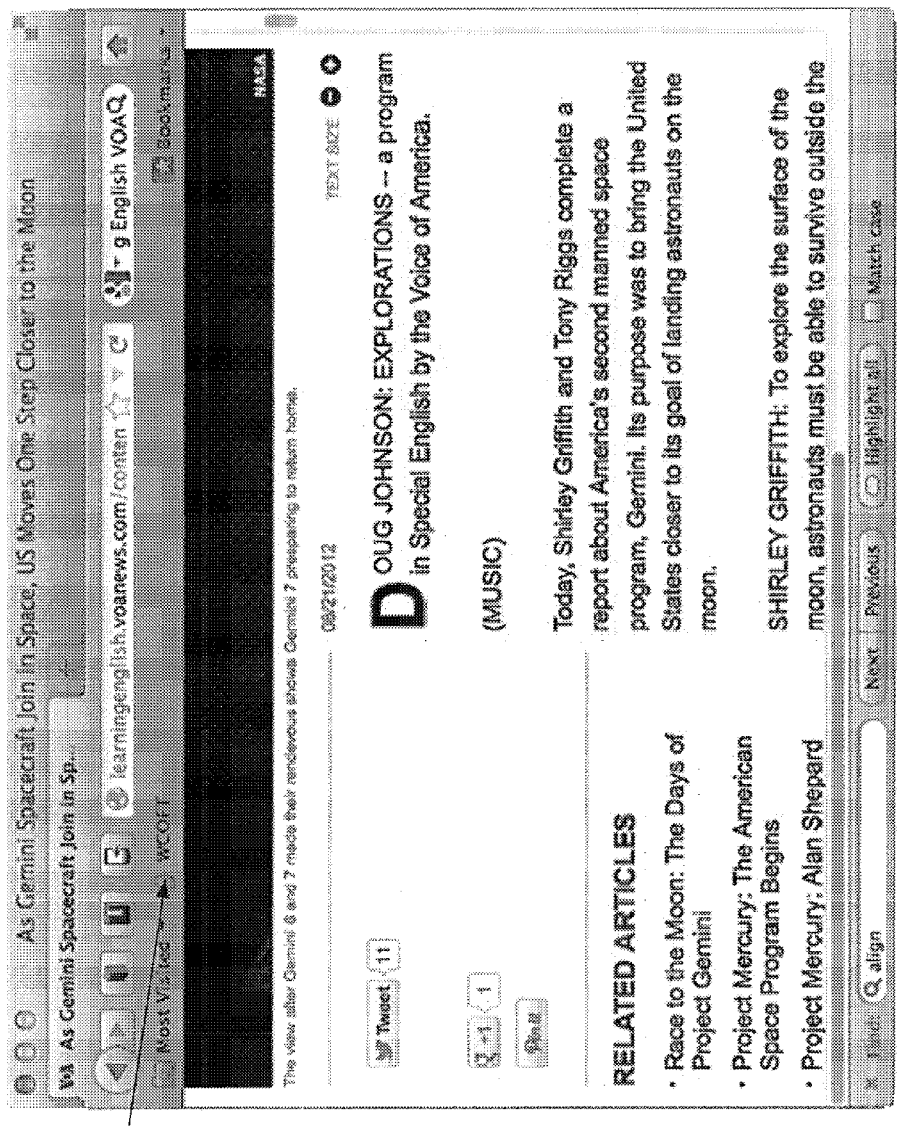
FIG. 7 is a screen shot that illustrates injecting a speech recognition engine into a web browser using a bookmarklet, according to an embodiment.

FIG. 7 is a screen shot that illustrates injecting the reading fluency training module 230 using a bookmarklet 780 on a web browser, according to an embodiment. As shown in FIG. 7, the bookmarklet 780 is injected to and identified as "WCOFT" (web-ontentoral fluency trainer) on the web browser. In some embodiments, the bookmarklet 780 can be installed by, for example, dragging a bookmarklet from a web page into the web browser without performing a software installation procedure. Such a web page can be hosted by a back-end server (e.g., the server device 160 in FIG. 1) of the reading fluency training system.

Figure 13:
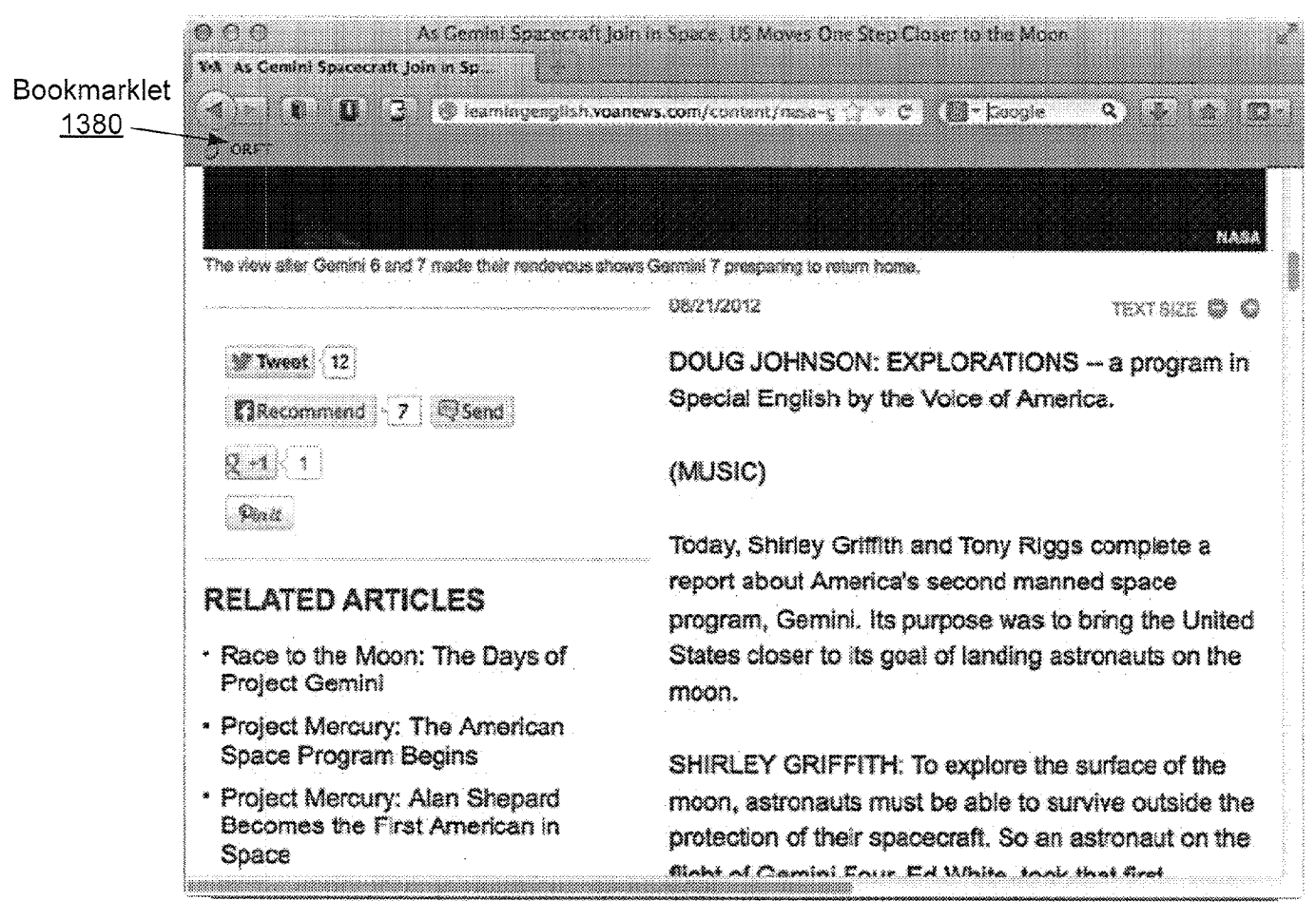

Similar to FIG. 7, FIG. 13 is a screen shot that illustrates injecting the reading fluency training module 230 using a bookmarklet 1380 on a web browser, according to another embodiment. As shown in FIG. 13, the bookmarklet 1380 is used to inject the reading fluency training module 230 identified as "ORFT" (oral reading fluency trainer) into the web browser. The bookmarklet 1380 can be used to inject the reading fluency training module 230 into the web browser using a method similar to that described above with respect to FIG. 7.

Returning to FIG. 2, in use of the reading fluency training system, a user (e.g., the user 130 in FIG. 1) of the client device 200 can direct a browser to a web page and invoke the reading fluency training system by, for example, selecting (e.g., clicking on a button or icon on a computer screen using a computer mouse, touching a button or icon on a touch screen using a finger) the associated bookmarklet icon (e.g., the bookmarklet 780 in FIG. 7, the bookmarklet 1380 in FIG. 13). The selecting the bookmarklet icon by the user instructs the web browser to inject the application code associated with the reading fluency training module 230, using the bookmarklet, into the currently visible web page. That is, the application code (e.g., JavaScript) of the reading fluency training module 230 can be inserted into and executed within the code or script (e.g., HTML script) of the current web page. Such application code can include application code of the SRE 260 and other modules included in the reading fluency training module 230. Once the application code is executed (e.g., at the processor 280), the reading fluency training module 230 can perform a series of initialization actions (e.g., initialization of the SRE 260, audio discovery, text processing, etc.) that enable the web page to be orally readable with visual highlighting, reading tracking, and instructional feedback. Once processing of the web page is complete, the reading fluency training module 230 can provide user interface controls to, among other functions, enable discovered audio to be played in synchrony with the text on the web page, allow the user to read the web page aloud with tracking, detect errors, and provide visual highlighting.

Figure 8:
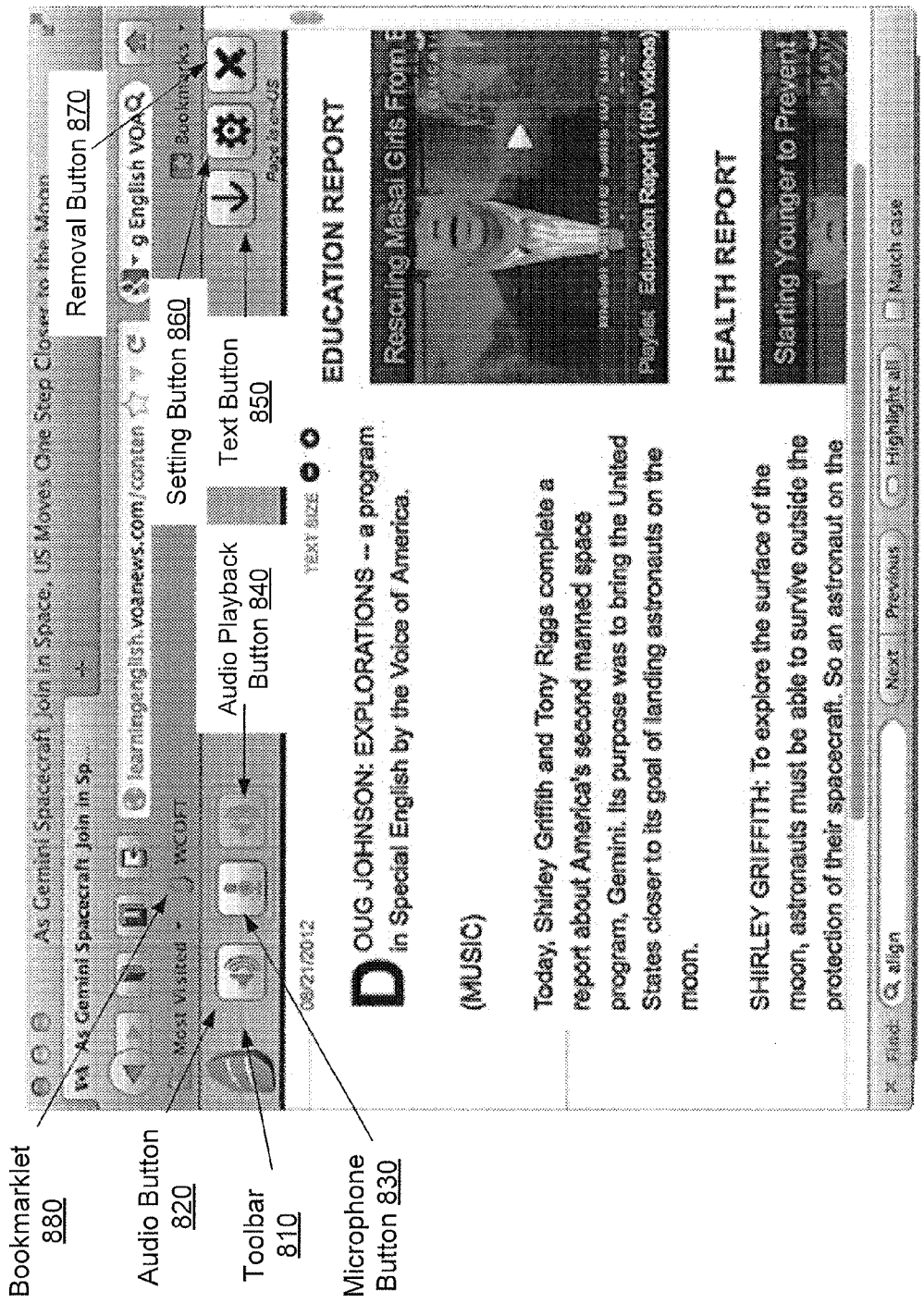
FIG. 8 is a screen shot that illustrates user interface controls for a web page, according to an embodiment.

FIG. 8 is a screen shot that illustrates user interface controls for a web page, according to an embodiment. As shown in FIG. 8, after a bookmarklet 880 (identified as "WCOFT") associated with the reading fluency training system injects the associated application code into the web browser and processing of the web page is complete (e.g., in response to a user selecting the bookmarklet 880), a toolbar 810 including a number of control icons (e.g., buttons 820-870) is injected into the web page. That is, the toolbar 810 is presented within the web page being displayed in the web browser as shown in FIG. 8, and the control icons in the toolbar 810 becomes executable (e.g., in response to being selected by the user).

Specifically, the audio button 820 indicates audio discovery, and selecting (e.g., clicking) the audio button 820 enables playing the discovered audio associated with the web page. The microphone button 830 enables a user (e.g., a language learner, a teacher, a tutor or a researcher who views the web page) to read text of the web page with tracking being highlighted on the web page. The audio playback button 840 enables the user to hear back her own voice (e.g., playing an audio recording of the user) or others' voices (e.g., playing audio recordings of the other users, playing an audio recording embedded in the web page). The text button 850 enables switch between different views of the web page. For example, selecting (e.g., clicking) the text button 850 can cause switch between a text-normalized view (e.g., a text-only view without any image or video clip, a view with advertisements stripped and only readable text present) of the web page using, for example, Adobe Flash, and an original view (with images, video clips, advertisements, as shown in FIG. 8) of the web page. The setting button 860 enables the user to configure settings of the toolbar 810. The removal button 870 enables removal (e.g., hiding) of the toolbar 810.

In some embodiments, more than one audio recording associated with the web page can be discovered and made accessible to a user (i.e., made available to be played to the user). For example, audio recordings associated with different text passages in the web page can be discovered and made accessible to the user. Furthermore, in some embodiments, multiple audio recordings associated with the same text passage in the web page can be discovered and made accessible to the user. For example, an audio recording of an article produced by an expert broadcaster can be provided, in an audio file linked to the web page (e.g., embedded in the HTML code of the web page), from a web server that hosts the web page (e.g., the server device 150 in FIG. 1). The audio recording can then be downloaded from the web server to the client device that accesses and displays the web page (e.g., the client device 120 in FIG. 1). For another example, audio recordings of the same article produced by other users (e.g., other language learners, armature speakers) can be stored at and provided from a data server associated with the reading fluency training system (e.g., the server device 160 in FIG. 1). Those audio recordings can then be downloaded from the data server to the client device. In some embodiments, although not shown in FIG. 8, user interface control icons of a web page can include one or more buttons (e.g., in the toolbar 810) to provide a viewer of the web page an option to access and play multiple audio recordings associated with the web page. For example, selecting (e.g., clicking) a button (not shown in FIG. 8) can enable the viewer to see and choose to play the top 5 ranked audio recordings of a text passage in the web page as posted by other users. These audio recordings can be ranked, for example, based on the type of user (e.g., a teacher versus a language learner), the number of errors detected in the audio recordings, and/or any other fluency rating criteria discussed herein.

Figure 14:
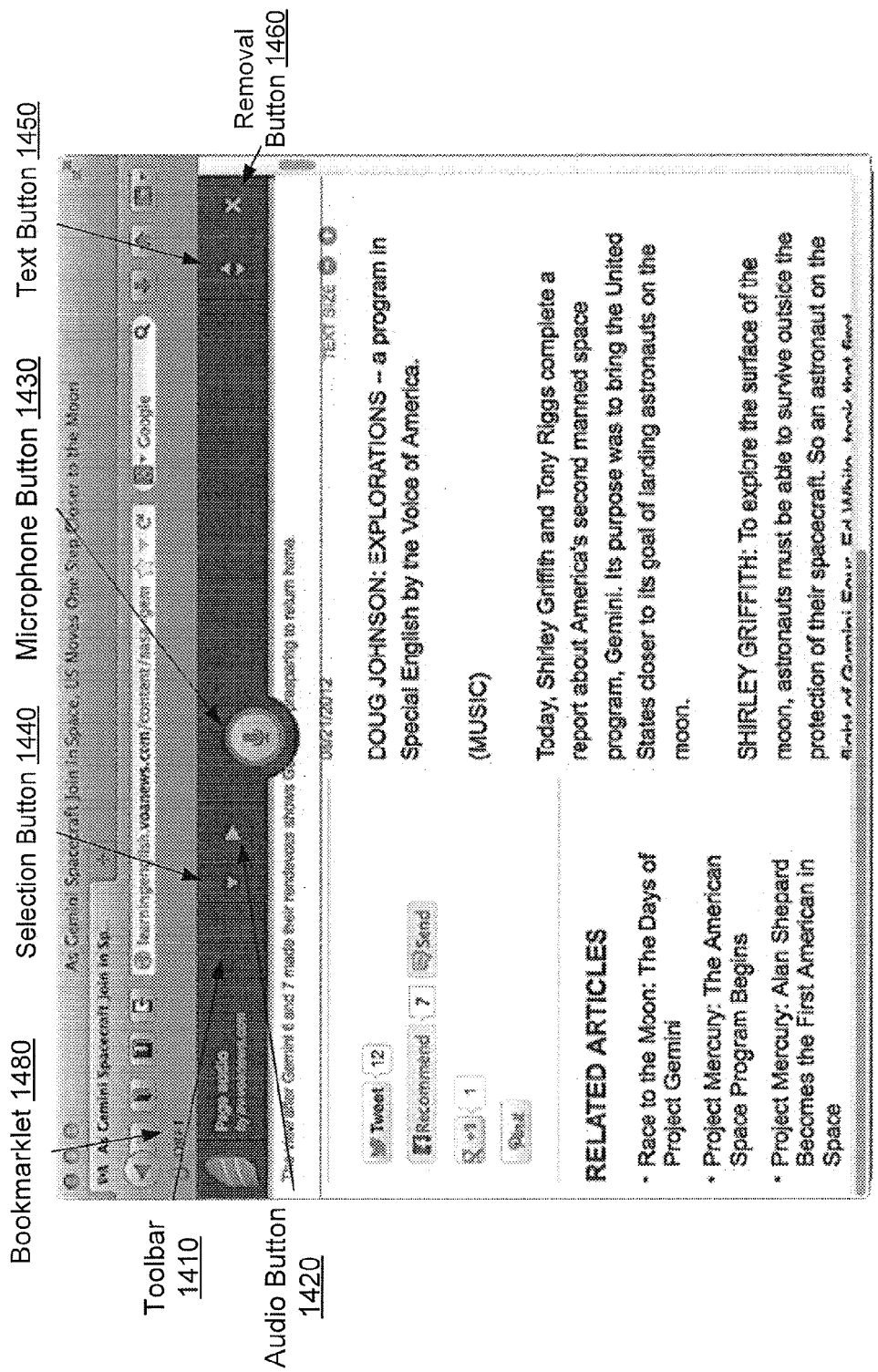
FIG. 14 is a screen shot that illustrates user interface controls for a web page, according to an embodiment.

Similar to FIG. 8, FIG. 14 is a screen shot that illustrates user interface controls for a web page, according to another embodiment. As shown in FIG. 14, after a bookmarklet 1480 (identified as "ORFT") associated with the reading fluency training system injects the associated application code into the web browser and processing of the web page is complete (e.g., in response to a user selecting the bookmarklet 1480), a toolbar 1410 including a number of control icons (e.g., buttons 1420-1460) is injected into the web page.

Specifically, the audio button 1420 enables playing an audio recording associated with the readable textual content of the web page. The audio recording played by selecting the audio button 1420 can be, for example, an audio recording produced by the user herself, an audio recording produced by another user of the reading fluency training system, an audio recording from an audio file embedded in the web page (e.g., produced by an expert), and/or the like. In other words, the audio button 1420 functions as a combination of the audio button 820 and the audio playback button 840 in FIG. 8.

Related to use of the audio button 1420, the selection button 1440 enables the user to select an audio recording from multiple audio recordings associated with the readable textual content of the web page (if such multiple audio recordings are available). In some embodiments, the audio recording(s) presented to the user (e.g., via selecting the selection button 1440) can be selected from a group of associated audio recordings based on a ranking of the audio recordings. For example, the top 5 ranked audio recordings of an article from all the audio recordings produced by the users of the reading fluency training system can be presented to the user. To select and then play an audio recording, the user can select the selection button 1440 to reveal selection of the multiple audio recordings (e.g., in a drop-down menu, in a pop-up window, etc.). After the user selects an audio recording from the multiple audio recordings (e.g., by selecting an icon representing that audio recording) and then selects the audio button 1420, the selected audio recording is played. In some embodiments, once the user produces an audio recording (e.g., by recording her own voice), that audio recording becomes the default for playback. That is, the audio recording produced by the user can be played by selecting the audio button without making a selection using the selection button 1440. In other embodiments, an audio recording can be determined as a default one for playback according to any other suitable rule. For example, the audio recording associated with the web page that was most-recently played by the user can be made the default one. For another example, the audio recording from the audio file embedded within the web page can be made the default one.

Similar to the text button 850 shown and described with respect to FIG. 8, the text button 1550 enables switching between different views of the web page. Specifically, by selecting (e.g., clicking) the up arrow or the down arrow in the text button 1450, the user can select a view of the web page from multiple views of the web page (if such multiple views of the web page are available). Similar to the removal button 870 shown and described with respect to FIG. 8, the removal button 1460 enables removal (e.g., hiding) of the toolbar 1410.

Returning to FIG. 2, in some embodiments, the reading fluency training module 230 can be instantiated as, for example, a client-side file inside of an Adobe Flash™ environment. In such embodiments, the file can be in an Adobe Flash™ file format such as, for example, SWF (Small Web Format). The core engine of the reading fluency training module 230 can be written in C/C++ or any other suitable programming language, but cross-complied into ActionScript Virtual Machine (AVM byte-code via tools such as, for example, FlashCC). In such embodiments, no manual installation or configuration is performed by the user of the client device 200. Furthermore, the speech recognition processing can be performed by the SRE 260 in the reading fluency training module 230 directly inside the web browser rather than on a back-end server (e.g., the server device 160 in FIG. 1). That is, the reading fluency training module 230 is injected as application code within the web page as opposed to performing speech recognition outside of the web browser, within the web browser's own source code, or remotely on a back-end server (e.g., the server device 160 in FIG. 1). As a result, the reading fluency training system can provide real-time (or substantially real-time) reactivity to the user's spoken words while avoiding issues related to network communication latency and/or server outages. In other embodiments, the function of the reading fluency training module 230 can be accomplished using other suitable means such as, for example, server-based speech recognition or speech recognition cross-compiled into, for example, JavaScript language via tools such as, for example, Emscripten.

Figure 3:
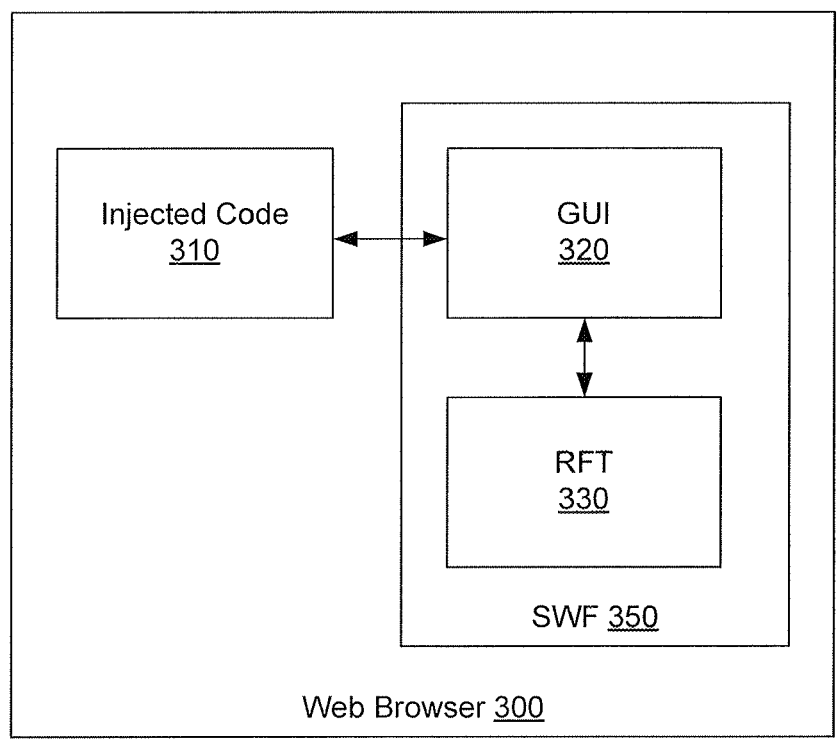
FIG. 3 is a schematic illustration of a web browser architecture, according to an embodiment.

FIG. 3 is a schematic illustration of a web browser architecture, according to an embodiment. RFT (reading fluency training module) 330 can be structurally and functionally similar to the reading fluency training module 230 shown and described with respect to FIG. 2. As shown in FIG. 3, the RFT 330 is instantiated within a client-side file (SWF 350) in the web browser 300. In operation, as described above, the RFT 330 can be injected as application code (shown as injected code 310) from the SWF 350 into the web browser 300 via, for example, GUI (graphic user interface) 320.

Returning again to FIG. 2, in some embodiments, the reading fluency training module 230 can implement one or more of three interaction modes for reading fluency instruction: a "read-aloud" mode (e.g., a user speaks the text content of the web page, and the text on the web page is highlighted in sync with the user's speech), a "hear-article" mode (e.g., prerecorded spoken audio plays and is matched to the text of the web page, and the text on the web page is highlighted in sync with the recording), and a "hear-myself" mode (e.g., the user's audio recording is played back with synchronized text highlighting, as a special case of the "hear-article" mode).

As shown in FIG. 2, the reading fluency training module 230 includes the audio discovery module 235, the visual highlighting module 237, the feedback module 239, and the SRE 260 that includes the reading tracking module 261 and the text processing module 262. In some embodiments, the reading fluency training module 230 can include more or less modules than those shown in FIG. 2. In some embodiments, each of the modules can be implemented in one or more than one processor and/or memory.

The audio discovery module 235 can be configured to discover audio associated with a web page displayed at the client device 200 (e.g., via the display device 210). That is, the audio discovery module 235 can be configured to examine the content (e.g., HTML content) of the web page and automatically discover links to audio files that are potentially related to the web page's content. Specifically, after audio discovery is triggered (e.g., by the user clicking the associated bookmarklet on the web browser), the audio discovery module 235 can be configured to perform the following steps.

Step 1: Gather the links associated with audio content (e.g., MP3 links) through various means and audio finding rules. For example, for a first audio finding rule, some web pages refer to the audio as an <a> link in the web page. Such links can be found by searching for the particular signature (e.g., .mp3 extensions) in the links' URLs (uniform resource locators). For a second audio finding rule, some web pages have the audio in SWF audio players. Such audio can be found by iterating through the SWFs in the web page and analyzing the FlashVars of these SWFs looking for URLs with the particular signature (e.g., .mp3 URLs). For a third audio finding rule, some web pages put the audio in a "popup". Such audio can be detected by searching for links that have some heuristic labeling such as, for example, "MP3", "Listen", "Download", etc. The audio discovery module 235 can then download the popup HTML and recursively invoke the other audio finding rules (e.g., the first and second audio finding rules) on the web page. In some embodiments, one or more of these rules can be used.

Step 2: Sort the audio URLs that are gathered in Step 1 by their edit-distance (e.g., Levenshtein distance) to the web page's URL and then select the audio with the smallest edit-distance. When there is more than one URL, one URL can be selected as the audio that represents the text (e.g., the audio URL is "similar" to the web page URL). In some embodiments, an audio from multiple URLs can be selected based on any other suitable method or rule.

In some embodiments, if no audio is discovered for a web page, or the discovered audio is unrelated to the text of the web page (e.g., the audio does not match the text of the web page), the web page or the audio can be flagged to a back-end server of the reading fluency training system (e.g., the server device 160 in FIG. 1). For example, a signal can be sent from the client device to the back-end server indicating the unavailability of the audio. The information can then be stored in the back-end server. As a result, the information can be used to notify subsequent users who access that web page and attempt to discover or retrieve audio associated with that web page.

In some embodiments, as described above with respect to FIG. 8, the audio discovery module 235 can be configured to discover audio files associated with the web page that are stored at and provided by a server that hosts the web page (e.g., the server device 150 in FIG. 1), as well as audio recordings associated with the web page that are stored at and provided by a server that hosts the reading fluency training system (e.g., the server device 160 in FIG. 1). For example, the audio discovery module 235 can identify an audio file containing an audio recording of an expert narrator on an article in the web page. The audio file can be stored at a first server hosting the web page and streamed into the reading fluency training module 230 from the first server. The audio discovery module 235 can also locate a number of audio recordings of users (including the current user and other users) of the reading fluency training system on the same article. The audio recordings produced by the users can be stored at, for example, a second server hosting a portion of the reading fluency training system (or a third-party server device not hosting any portion of the reading fluency training system) and streamed into the reading fluency training module 230 from the second server (or the third-party server device).

The audio discovery process performed by the audio discovery module 235 provides a means for real-time (or substantially real-time) text processing. When an audio recording associated with a web page (e.g., produced by a user, embedded within the web page) is discovered, the audio recording can be sent (e.g., streamed) to both the audio output device 250 for playing and the SRE 260 for processing at the same time (or substantially the same time). Specifically, the audio recording can be decoded into small chunks (e.g., every 50 to 250 milliseconds), which are then sent sequentially to the audio output device 250 and the SRE 260. In operation, a user of the client device 200 can select a button (e.g., the audio button 820 in FIG. 8 or the audio button 1420 in FIG. 14) in an associated toolbar (e.g., the toolbar 810 in FIG. 8 or the toolbar 1410 in FIG. 14) to play the discovered audio clip. If the clip's audio relates to the text shown on the web page, the user can see the text being highlighted in real-time (or substantially real-time) as the audio is played. The term "real-time" as used herein refers to highlighting words in a web page displayed on a display device (e.g., the display device 210) at a rate that provides near visual synchrony between the highlighted words in the web page and the audio being heard by the user (e.g., via a speaker) or the associated spoken words produced by the user (e.g., via a microphone). In some embodiments, the delay between the audio (or the spoken word) and the highlighted word can be within, for example, 50 milliseconds, 100 milliseconds, 200 milliseconds, etc.

In some embodiments, implementation of the reading fluency training system does not require pre-alignment of text with the audio. In such embodiments, the reading tracker (e.g., performed by the reading tracking module 261) operates on the audio recording as if the audio recording was input from the audio input device 240 (e.g., a microphone) of the client device 200. Such a method provides instant tracking on an audio file of any arbitrary length. In some embodiments, for example, audio can be streamed into the reading fluency training module 230, hence fully downloading the audio linked onto a web page is not necessary. In some embodiments, the audio found on a web page can be downloaded, decompressed, and processed by the reading fluency training module 230 in real-time (or substantially real-time) while the audio is played out at the client device 200 (e.g., via the audio output device 250). This feature allows the reading fluency training system to immediately (or substantially immediately) begin highlighting words on the display (e.g., the display device 210) of the client device 200 as the audio from the web page is played.

In some embodiments, the audio discovery module 235 can be configured to explore the Document Object Model (DOM) of the web page to find, for example, MP3 anchor tags. In some embodiments, when audio is not discovered as linked to the web page content, the reading fluency training system can use other suitable methods to create an audio rendering of the web page such as, for example, text-to-speech synthesis, crowd sourced recording, and/or the like.

As shown in FIG. 2, the text processing module 262 and the reading tracking module 261 collectively perform a speech recognition function (represented by SRE 260) associated with providing oral reading fluency training exercises to users of the reading fluency training system. Specifically, the text processing module 262 can be configured to process text content of the web page displayed at the client device 200. In some embodiments, the text processing module 262 can be configured to extract relevant portions of the text (e.g., an article) from the web page. In such embodiments, the text processing module 262 can be configured to strip or disregard irrelevant content such as, for example, advertisements or extraneous text (e.g., sidebars, user page comments) that do not relate to the core content of the web page (e.g., the article). In some embodiments, simple heuristic-based approaches for identifying the relevant text portion of the web page can be used by the text processing module 262 to pre-filter the web page to find the text of interest and to improve modeling accuracy by the SRE 260. Approaches for text discovery include, for example, web services such as Readability (http://readability.com) and open source tools such as Boilerpipe (http://code.google.com/p/boilerpipe/). Some of the approaches can provide APIs (application programming interfaces) to render the relevant part of the web page in a simpler readable format.

In some embodiments, such a text extraction process can be performed at a back-end server (e.g., the server device 160 in FIG. 1) of the reading fluency training system or a third-party server independent from the reading fluency training system (e.g., a third-party that provides a web service for text extraction). In such embodiments, the readable textual content of the web page can be extracted at the back-end server or the third-party server (e.g., using the text discovery approaches described above) and then sent to the client device 200 for further processing.

Figure 11:
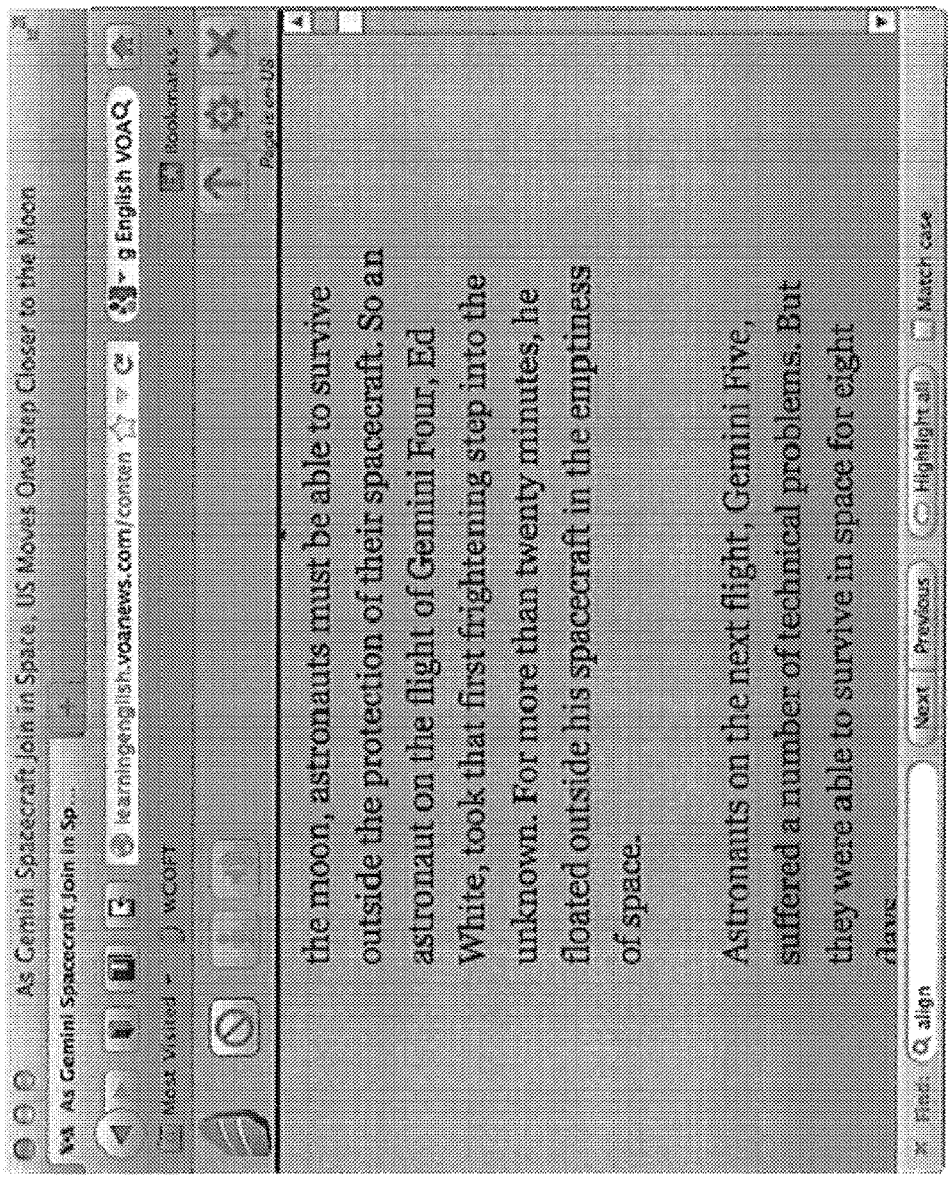
FIG. 11 is a screen shot that illustrates a text-normalized view of a web page, according to an embodiment.
Figure 16:
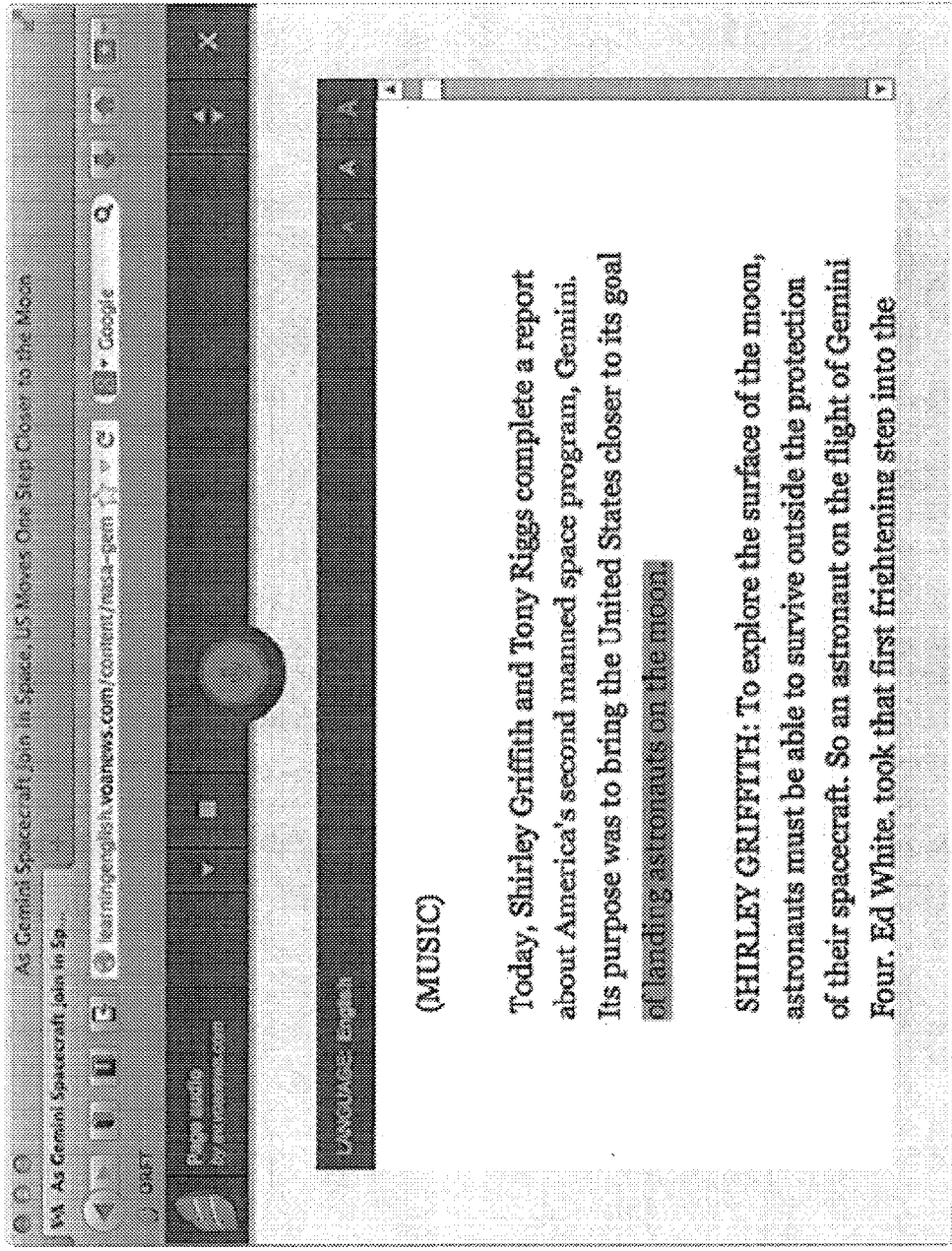
FIG. 16 is a screen shot that illustrates a text-normalized view of a web page, according to an embodiment.

FIGS. 11 and 16 are screen shots that each illustrates a text-normalized view of a web page, according to an embodiment. As shown in FIGS. 11 and 16, the text-normalized views of the web pages show a result after text discovery and stripping of irrelevant information (e.g., advertisements, images) from the original views of the corresponding web pages.

The text processing module 262 can be configured to perform global character index alignment based on the readable textual content extracted from the web page. Specifically, in some embodiments, the SRE 260 accepts a single monolithic block of text and returns character/word indices relative to that block of text. Meanwhile, the web page DOM represents character indices in the context of its individual elements. Thus, as far as the DOM is concerned, the text is fractured into tiny pieces. The text processing module 262 can be configured to implement a mapping between the SRE-modeled text character indices and the webpage DOM character index positions.

Figure 9:
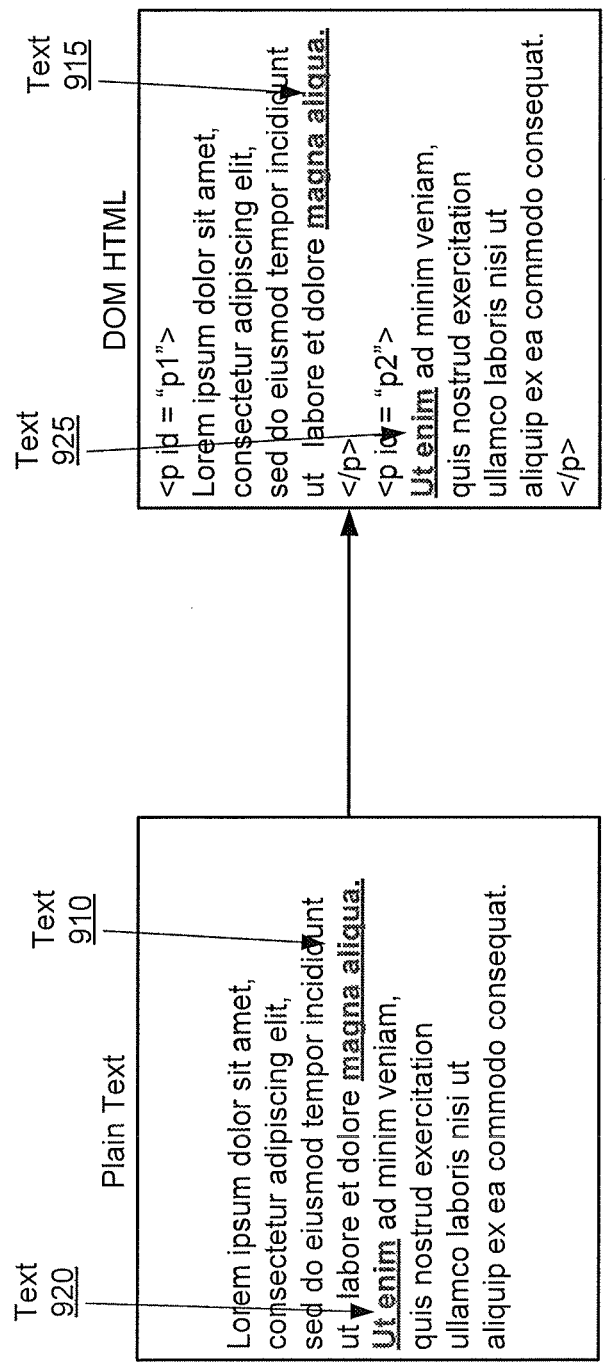
FIG. 9 is a schematic illustration of a mapping of character indices, according to an embodiment.

FIG. 9 is a schematic illustration of a mapping of character indices, according to an embodiment. Specifically, character indices from the plain text modeled by the text processing module 262 can be mapped to character indices locations on the DOM HTML of the web page. As shown in FIG. 9, text strings "magna aliqua" (text 910) and "Ut enim" (text 920) are associated with successive character indices in the plain text modeled by the text processing module 262, while the corresponding text strings (text 915 and text 925) are associated with separate character indices locations (i.e., in two paragraphs, respectively) in the DOM HTML.

Figure 10:
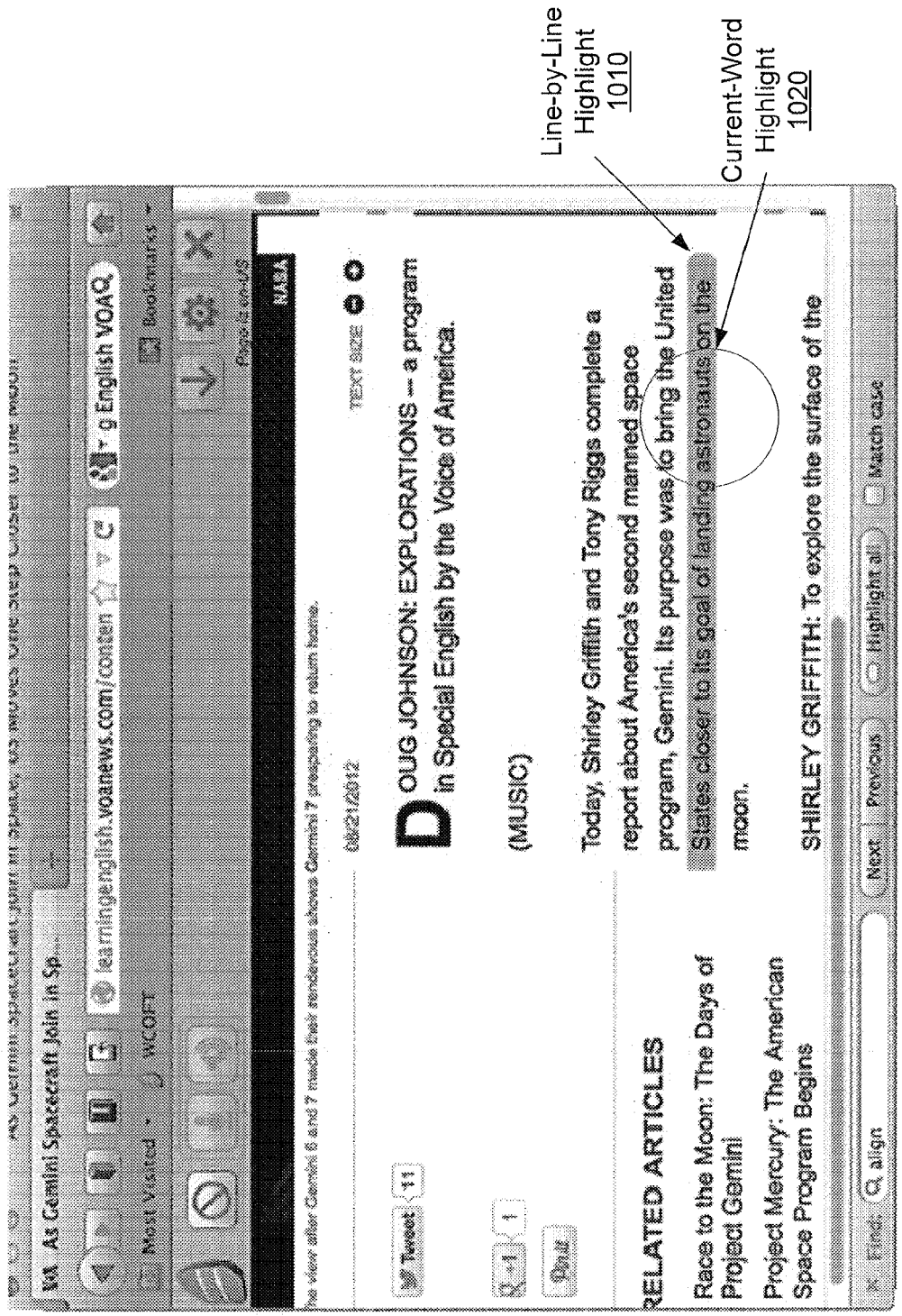
FIG. 10 is a screen shot that illustrates on-screen highlighting within a web page during practiced reading, according to an embodiment.
Figure 15:
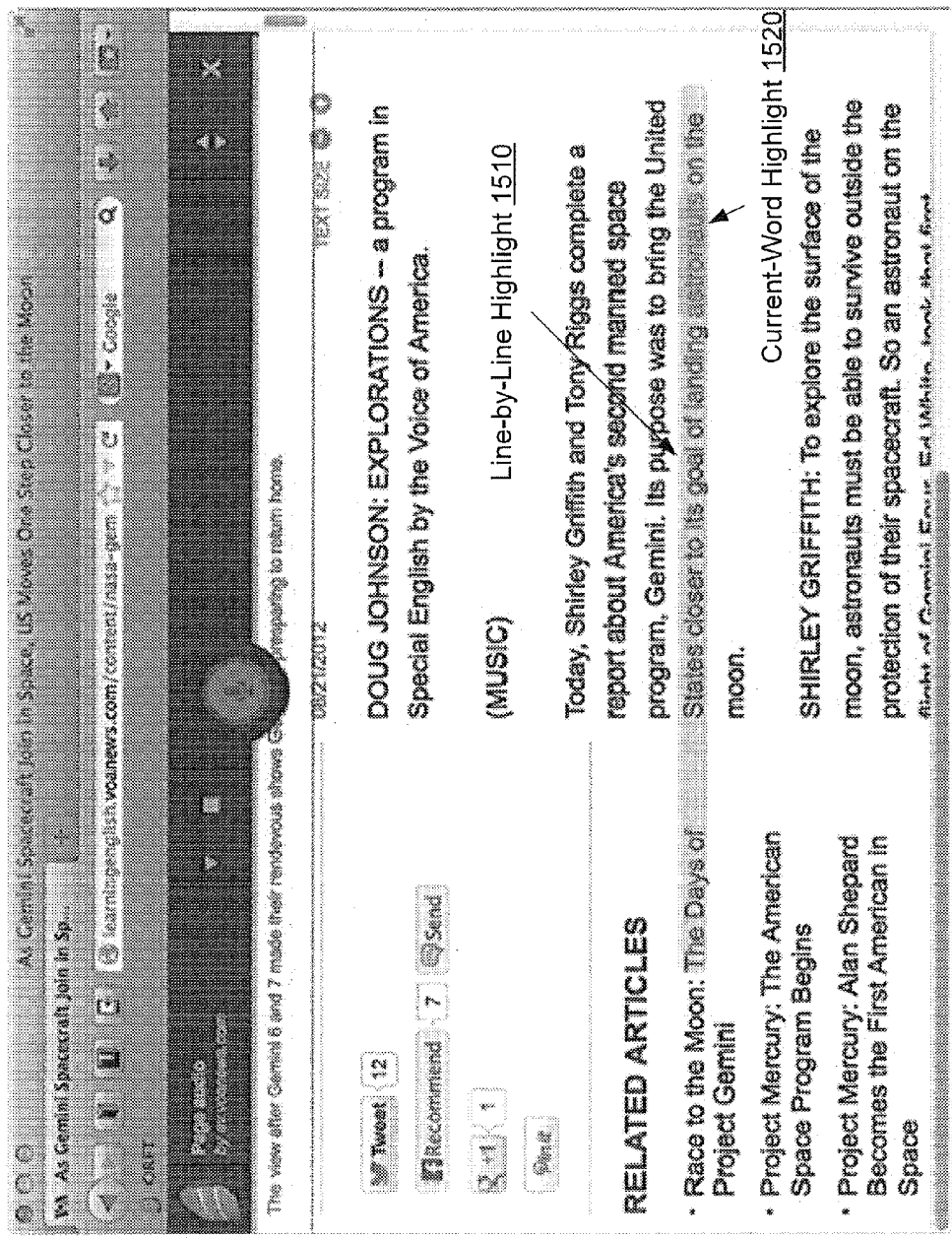
FIG. 15 is a screen shot that illustrates on-screen highlighting within a web page during practiced reading, according to an embodiment.

FIGS. 10 and 15 are screen shots that each illustrates on-screen highlighting within a web page during oral practiced reading, according to an embodiment. As shown in FIGS. 10 and 15, the character index alignment problem consists of determining how a highlighting range of the plain text is translated to corresponding locations within the web page DOM. In FIGS. 10 and 15, a line of the text is highlighted in a color (e.g., in yellow, shown as the line-by-line highlight 1010 in FIG. 10 and the line-by-line highlight 1510 in FIG. 15), and the current word is further highlighted in a different color (e.g., in green, shown as the current-word highlight 1020 in FIG. 10 and the current-word highlight 1520 in FIG. 15).

In some embodiments, when the text is extracted from the web page, a data structure can be defined that maintains this mapping from plain text character indices to DOM element indices. Such a mapping allows the positions in text as determined by the text processing module 262 to be mapped directly onto controls for character manipulation (e.g., highlighting) on the display of the web page. For example, the mapping process can be performed by sequentially operating the following three steps on each node in the DOM: (1) obtain an index of the current node by determining a current length of the accumulated plain-text string; (2) append the current node and its index to an array; and (3) append the plain-text representation of the current node to the accumulated plain-text string. Eventually, the accumulated plain-text string contains a plain-text representation of each node in the DOM. As a result, when the SRE 260 emits a character index, the array can be searched to locate the node that has the nearest start index. In some embodiments, web page character positions can be calculated in any other suitable methods to avoid the intermediate character-mapping problem.

In some embodiments, the SRE 260 can include acoustic models and/or pronunciation lexicons that provide knowledge, data and/or information about the language of the web page that is being read by the user. In some embodiments, after the SRE 260 is activated for a web page (e.g., by the user selecting the associated bookmarklet on the web browser), the SRE 260 (e.g., via the text processing module 262) can be configured to send the web page's URL to a back-end server (e.g., the server device 160 in FIG. 1) of the reading fluency training system. In response to receiving the web page's URL, the back-end server can be configured to extract readable text content from the web page, and then identify a language for the text of the web page. Specifically, the back-end server can be configured to identify the language for the text by classifying the text into one of a number of candidate languages based on analysis performed on the text and/or code of the web page. In some embodiments, the language code of the web page (e.g., determined from the HTML5 standard) can be used to identify the appropriate language for the text of the web page. In some other embodiments, other approaches can be used to detect the language of the web page when HTML5 tags are not available. For example, character n-grams can be used as a means to compute the probability of a language in a typed script given an input document.

After the language of the text is identified, the back-end server can send a signal indicating the identified language to the SRE 260. Thus, the SRE 260 (e.g., via the text processing module 262) can be configured to download the corresponding acoustic models and/or pronunciation lexicons associated with the identified language from the back-end server. Furthermore, the text processing module 262 can configure the SRE 260 accordingly based on the downloaded acoustic models and/or pronunciation lexicons associated with the language identified for the text of the web page.

In some embodiments, the text processing module 262 can be configured to perform a text normalization process to turn numbers/dates/times into readable text (e.g., $19 to "nineteen dollars"), thus enabling the SRE 260 to lookup or predict the pronunciation more accurately. The text processing module 262 can be configured to implement any suitable methods for text normalization, such as punctuation stripping to reveal the word to be recognized, or extensions to expanding numerals and dates and other ill-formatted data.

The reading tracking module 261 can be configured to map words recognized from the text processing module 262 to character and/or word positions on a reference text that is displayed at the client device 200 (e.g., via the display device 210). In some embodiments, the reading tracking module 261 can be configured to model a reference block of text (e.g., an article) using, for example, a backoff n-gram language model (e.g., n=3). In other embodiments, the reading tracking module 261 can use other suitable modeling methods such as, for example, grammar-based language models, fixed and/or variable length n-gram models.

As audio is provided to (e.g., fed or streamed into) the SRE 260, words can be identified by the reading tracking module 261. The identified word sequence can contain substitutions, deletions, and/or word insertions depending on the accuracy of the user's reading of the text and the accuracy of the underlying machine (e.g., the client device 200 including the reading fluency training module 230). The reading tracking module 261 can be configured to match the words identified to the text to determine reading locations. The reading tracking module 261 can then be configured to convert the text locations into character locations on the web page using the character mapping method described above with respect to the text processing module 262 and FIG. 9.

For example, the longest contiguous path in the source text can be determined at regular intervals using the last N words identified by the reading tracking module 261 (e.g., N=13). The end-point of the longest contiguous path of identified and/or recognized words that matches the source text can be considered a candidate for the current reading position. Heuristics related to the number of word matches along the path can be used to determine if the reading position on the web page should be advanced or not. As input audio is received, the reading tracking module 261 can output additional identified and/or recognized words that are then again matched to the source text using the longest contiguous path finding method described above. The frequency of the matching process can control the reactivity of the tracker to the user's voice. In some embodiments, updates can be made, for example, every 50 to 250 milliseconds or more often. In some embodiments, various alternative approaches can be used to solve the text alignment problem for reading tracking. For example, the alignment between the SRE-hypothesized text and the reference text can be made using the Viterbi algorithm in combination with acoustic units smaller than words.

The visual highlighting module 237 can be configured to highlight tracked text on the display of the client device 200 (e.g., via the display device 210). In some embodiments, various methods of highlighting can be used such as, for example, word-by-word highlighting (i.e., the currently spoken word is highlighted), line-by-line highlighting (i.e., the entire line containing the current word is highlighted), sentence-by-sentence highlighting (i.e., the current sentence is highlighted), and/or the like.

In some embodiments, the web browser of the client device 200 can provide APIs that allow for text to be highlighted on the display. For example, text highlighting can be performed using the Range API associated with the web browser. Using information from the Range API, the visual highlighting module 237 can be configured to float a transparent colored div element over the text being tracked, and slide/resize it as needed (e.g., as shown in FIGS. 10 and 11). In some other embodiments, other methods can be used to highlight the text within an HTML document to provide visual feedback (e.g., font colors can be changed, font types can be altered, words can be made bold/unbold, etc.).

The feedback module 239 can be configured to provide instructional feedback regarding the user's oral reading fluency. The feedback can be provided in various methods after the user finishes reading. The feedback can be presented in terms of, for example, reading rate, disfluent pause locations, visual highlighting of slowly spoken words, ill-pronounced words, and other reading errors.

In some embodiments, the feedback module 239 can be configured to compute reading rate in terms of words correct per minute (WCPM) globally as well as a localized reading rate metric for each spoken word. Words that are spoken too slowly can be visually highlighted (e.g., using a color different from highlighting for words spoken at a normal rate) on the display. Significant and disfluent pause locations can also be displayed within the text of the web page and rendered visually by the web browser.

In some embodiments, the feedback module 239 can also detect which words were not read by the user, or those not pronounced well. Such metrics can be tracked over multiple reading sessions and aggregated statistically. In some embodiments, feedback can be made available on the toolbar of the application. For example, the feedback module 239 can be configured to display on the toolbar the overall reading rate and the number of significant pauses made while reading. In some embodiments, the feedback module 239 can be configured to play audio of words that the user stumbled or paused on (e.g., using pre-recordings or text-to-speech synthesis) as well as compare the user's reading with that of other users, or compare to native readings when available through crowd-sourcing. In some embodiments, users can select parts of the text and have the words and phrases synthesized by a computer to provide pronunciation feedback. Other alternatives to this approach include, for example, crowd sourcing of audio recordings from native speakers of the language.

Figure 4:
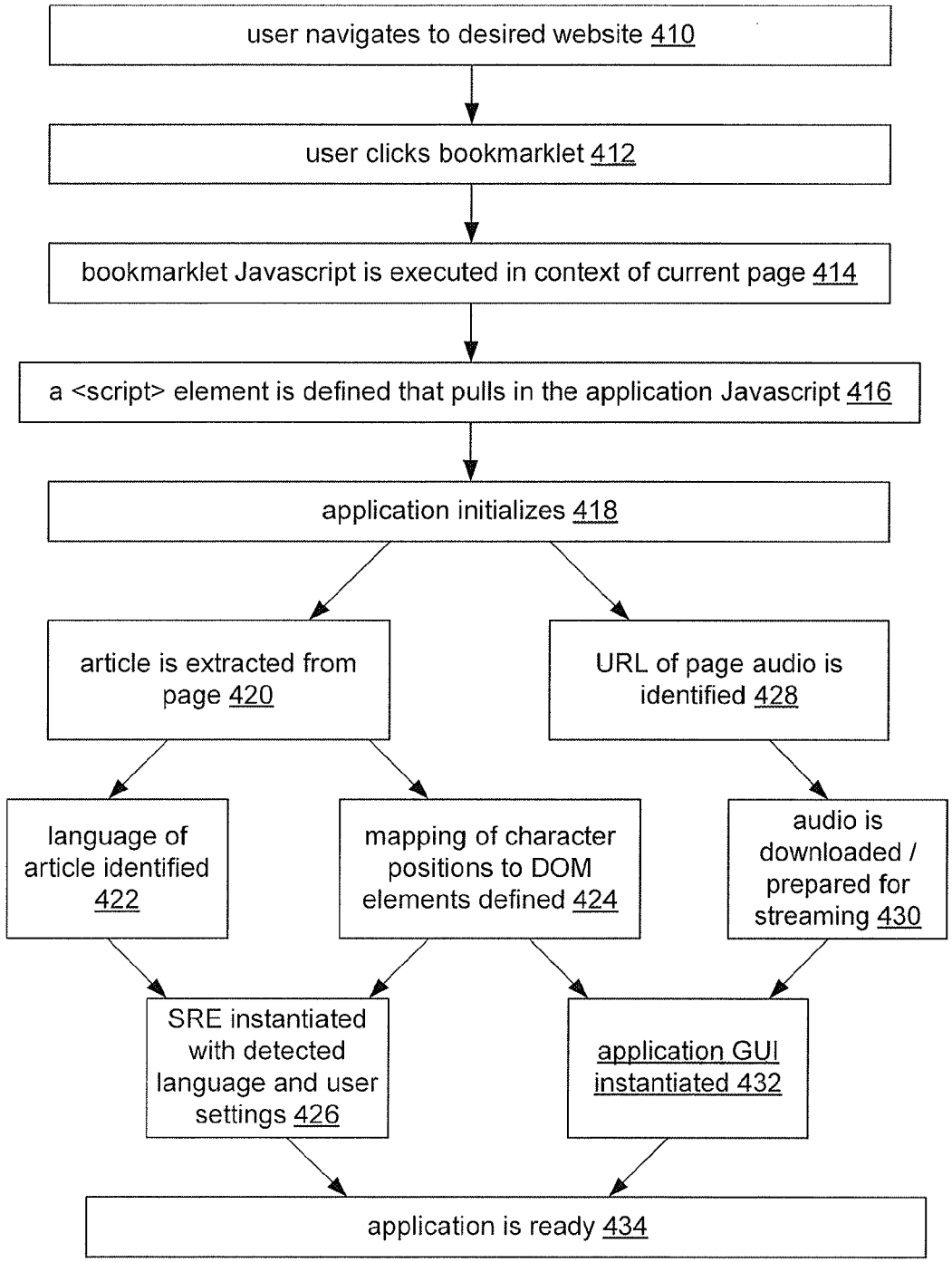
FIG. 4 is a flow chart illustrating a method for initializing an application associated with a reading fluency training system, according to an embodiment.
Figure 5:
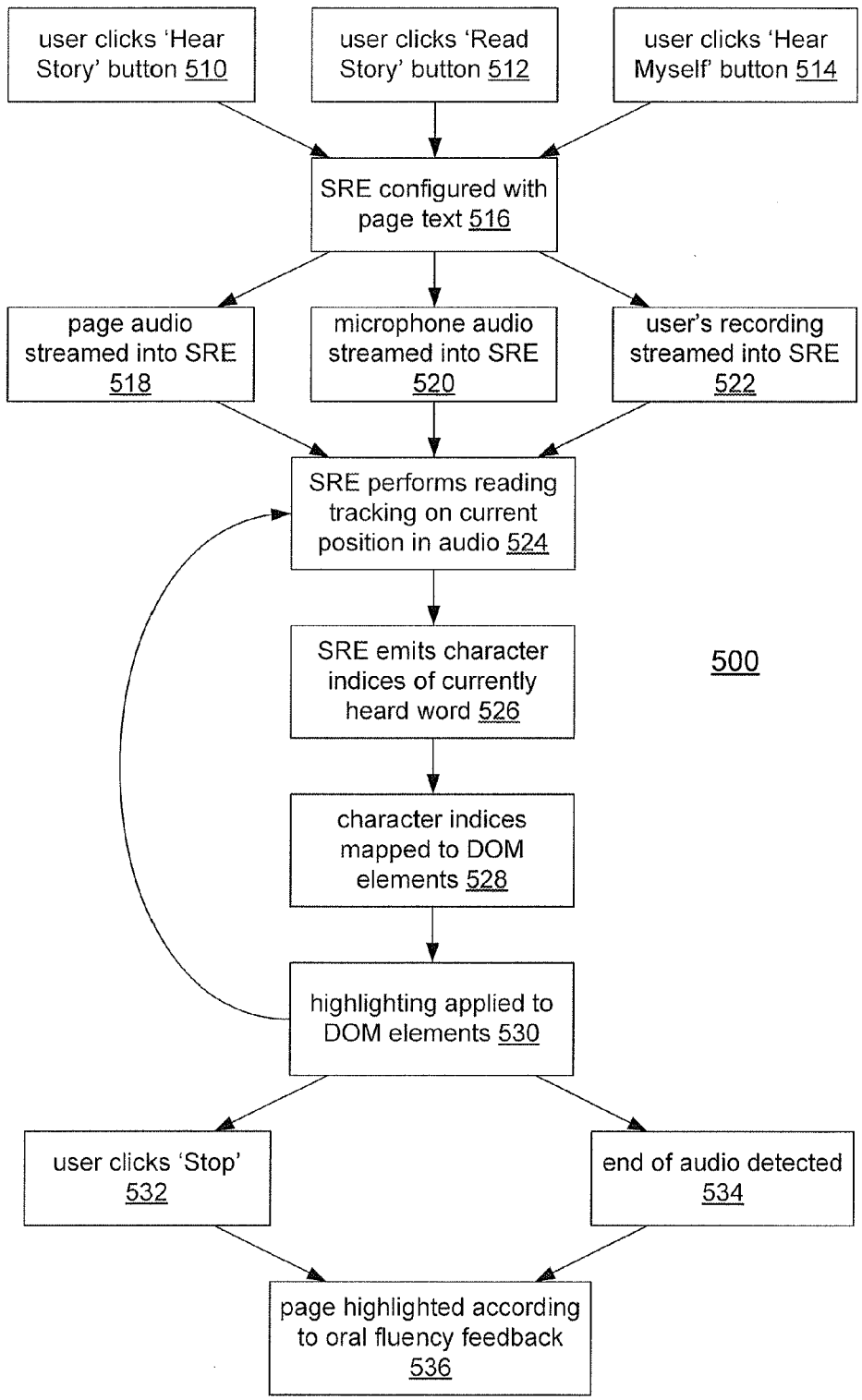
FIG. 5 is a flow chart illustrating a method for tracking and highlighting reading, according to an embodiment.
Figure 6:
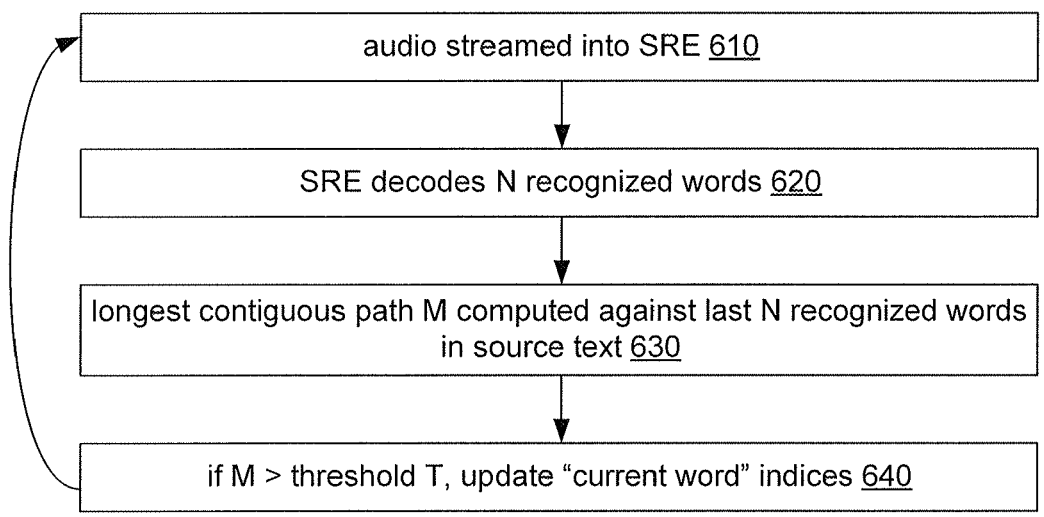
FIG. 6 is a flow chart illustrating a method for implementing a reading-tracker, according to an embodiment.

FIGS. 4-6 are flow charts illustrating methods 400, 500, 600 performed by a reading fluency training module associated with a reading fluency training system (e.g., the reading fluency training system 100 in FIG. 1). The reading fluency training module can be structurally and functionally similar to the reading fluency training module 230 shown and described with respect to FIG. 2. Particularly, the reading fluency training module can include a SRE similar to the SRE 260 in FIG. 2. Similar to the reading fluency training module 230, the reading fluency training module executing and/or performing the methods 400, 500, 600 can be hosted and executed, as a portion of the reading fluency training system, in a client device (e.g., the client device 120 in FIG. 1, the client device 200 in FIG. 2) including a processor (e.g., the processor 280 in FIG. 2) and a memory (e.g., the memory 220 in FIG. 2). The methods 400, 500, 600 can be executed at one or more modules of the reading fluency training system and/or other components of the client device. In some embodiments, the memory of the client device can be, for example, a non-transitory processor-readable medium. The code representing instructions to perform the methods 400, 500, 600 can be stored in the non-transitory processor-readable medium of the client device, and executed by the processor of the client device. The code includes code to be executed by the processor to cause the module(s) of the reading fluency training system and/or other components of the client device to operate the functions illustrated in FIGS. 4-6 and described as follows.

FIG. 4 is a flow chart illustrating the method 400 for initializing an application associated with the reading fluency training system, according to an embodiment. At 410, a user of the client device navigates to a desired website using, for example, a web browser of the client device. At 412, the user selects (e.g., clicks) a bookmarklet associated with the reading fluency training module. The bookmarklet can be instantiated in the web browser prior to the user viewing the website, as described above with respect to FIG. 2. At 414, in response to the user selecting the bookmarklet, the bookmarklet JavaScript is executed in context of the current web page. At 416, as a result of the bookmarklet JavaScript being executed, a <script> element is defined that pulls in the application JavaScript. At 418, the application begins to be initialized based on the JavaScript.

At 420, an article is extracted from the web page. The article can be extracted by, for example, a text processing module (e.g., the text processing module 262 in FIG. 2) of the SRE. In response to analyzing the extracted article, at 422, a language can be identified for the article; and at 424, a mapping of character positions to DOM elements can be defined by, for example, the text processing module of the SRE. Thus, at 426, the SRE is instantiated with the identified language and user settings being configured based on the mapping and the identified language.

Meanwhile, at 428, a URL of an audio file is identified from the web page by, for example, an audio discovery module (e.g., the audio discovery module 235 in FIG. 2) of the reading fluency training module. Next, at 430, audio is prepared for streaming at the client device. Based on the mapping and the audio streaming, at 432, the application's GUI is instantiated. Finally, at 434, as both the SRE and the GUI are instantiated, the application for the reading fluency training module is ready for tracking spoken words.

FIG. 5 is a flow chart illustrating the method 500 for tracking and highlighting reading, according to an embodiment. The method 500 can be triggered by one of three actions: a user can (1) select a "Hear Story" button (e.g., the audio button 820 in FIG. 8, or the audio button 1420 (after making a selection using the selection button 1440) in FIG. 14) on the toolbar (e.g., the toolbar 810 in FIG. 8 or the toolbar 1410 in FIG. 14) of the application (at 510); (2) select a "Read Story" button (e.g., the microphone button 830 in FIG. 8 or the microphone button 1430 in FIG. 14) on the toolbar (at 512); or (3) select a "Hear Me" button (e.g., the audio playback button 840 in FIG. 8, or the audio button 1420 (after making a selection using the selection button 1440) in FIG. 14) on the toolbar (at 514). As a result, at 516 the reading fluency training module is configured with text content of the web page.

To collect audio from an appropriate source, the reading fluency training module can perform one of three operations in response to the triggering actions by the user: in response to the user selecting the "Hear Story" button (at 510), audio discovered from the web page can be streamed into the SRE (at 518); in response to the user selecting the "Read Story" button (at 512), audio collected by a microphone of the client device can be streamed into the SRE (at 520); in response to the user selecting the "Hear Myself" button (at 514), audio of the user's own recording can be streamed into the SRE (at 522).

Next, at 524, the SRE performs reading tracking on the current position in the audio. The reading tracking can be performed by, for example, a reading tracking module (e.g., the reading tracking module 261 in FIG. 2) of the SRE. At 526, the SRE emits character indices of the currently-heard word. At 528, the character indices are mapped to DOM elements. At 530, highlighting is applied to the mapped DOM elements in a displayed view of the web page. The highlighting can be performed by, for example, a visual highlighting module (e.g., the visual highlighting module 237 in FIG. 2) of the reading fluency training module. Then, the audio moves to next word (or phrase, sentence), and the steps 524-530 are repeated to track the current position in the audio.

At the end, one of two possible events can cause the play of the audio and the tracking operation: the user selects a "Stop" button (at 532) or the end of the audio is detected (at 534). After the training exercise is complete, at 536, the web page is highlighted according to oral fluency feedback. The feedback can be provided by, for example, a feedback module (e.g., the feedback module 239 in FIG. 2) of the reading fluency training module.

FIG. 6 is a flow chart illustrating the method 600 for implementing a reading-tracker, according to an embodiment. At 610, audio is streamed into the SRE. At 620, the SRE decodes N recognized words from the audio. N can be, for example, 13 or any other suitable number. At 630, the longest contiguous path M is computed against the last N recognized words from the source text. M can be any number equal to or less than N. For example, N can be 13 and M can be 10. At 640, the computed M is compared against a threshold T. If M is greater than T, then the "current word" indices are updated based on the path M. T has a fixed associated with N. For example, N can be 13 and T can be 9. Thus, if M is computed to be 10, then the "current word" indices are updated based on the path M. Otherwise, if M is not greater than 9, then the "current word" indices remain unchanged.

In some embodiments, the reading fluency training system described herein can be used as a social game with learner fluency ranking. Specifically, using a combination of reading fluency metrics computed by the reading fluency training system and a ranking system (e.g., the Elo relative pairwise ranking system), the oral reading fluency of one language learner can be compared and ranked against other language learners in a user population. In such embodiments, the language learners can be scored based on their reading, and the ranking system can be established to group or characterize different language learners based on, for example, their proficiency level with the language.

For example, learner A and learner B each reads a passage of text aloud. The fluency metrics scores for learner A and learner B can then be used to compare learner A's reading to learner B's reading. Higher fluency metrics for learner A indicate a win for learner A and a loss for learner B. Using the ranking system, the learners' outcome can be used to rank learner A and learner B against other learners. Thus, the oral reading exercises can be made more engaging, fun and competitive as an online activity.

In some embodiments, the reading fluency training system described herein can be used to provide a social sharing of read-aloud recordings. For example, a language learner who is a native English speaker can read and record English web pages and share the audio recordings with language learners who wish to learn English. Conversely, a language learner who is a native Spanish speaker but wishes to learn English can contribute native recordings of Spanish web pages and listen to those recordings shared by the native English speakers. Through community-based sharing and contributions of audio recordings, web pages can become playable and synchronized with the text of the web pages using the reading fluency training system and its methods described herein. Furthermore, the community of language learners can rank their shared recordings in terms of, for example, comfort of reading, fluency, clarity, and/or the like, to allow the best native recordings to be easily accessible to other language learners.

In some embodiments, audio recordings produced by users of the reading fluency training system can be updated onto and stored at, for example, a server associated with the reading fluency training system (e.g., the server device 160 in FIG. 1) and/or a third-party server configured to store a database of audio recordings. In such embodiments, each user can indicate a decision to share her audio recording(s) with one or more other users. For example, a user can decide to share a first audio recording with her family members; share a second audio recording with her friends; share a category of audio recordings with a community of language learners; share a set of audio recordings with every other user; and/or the like. Thus, when a user uses a client device (e.g., the client device 120 in FIG. 1) to access the web page, the audio recordings shared by other users and accessible to that user can be discovered and made available to that user from the server associated with the reading fluency training system and/or the third-party server (e.g., by downloading or streaming the audio recordings into the client device). Furthermore, if a user decides to not share an audio recording with anyone else, the audio recording can be stored at the server of the reading fluency training system and/or a third-party server but not accessible to other users.

In some embodiments, the reading fluency training system described herein can be used to provide a social sharing of fluency ranking. In such embodiments, language learners can read passages of text aloud and submit their recordings for feedback from other native language learners of a community of users. Specifically, using crowd-sourcing techniques, language learners can get valuable feedback beyond what is the current state-of-the-art for speech recognition technology. For example, an audio recording made by a language learner can be critiqued by many individuals (not just a single human coach), and later retrieved by that language learner to inform about her reading fluency progress as well as tips to improve her fluency during oral reading.

In some embodiments, the reading fluency training system described herein can be used to support early readers with guided reading modes. In such embodiments, rather than requiring a beginning learner of a language to read an entire passage, an individual sentence can be highlighted and the beginning learner can be prompted to read the individual sentence. The beginning learner can be allowed to advance onto the next sentence if the sentence is read sufficiently well. This method provides an increased accuracy for reading tracking, and allows for more robustness to highly disfluent or mispronounced speech.

Figure 12:
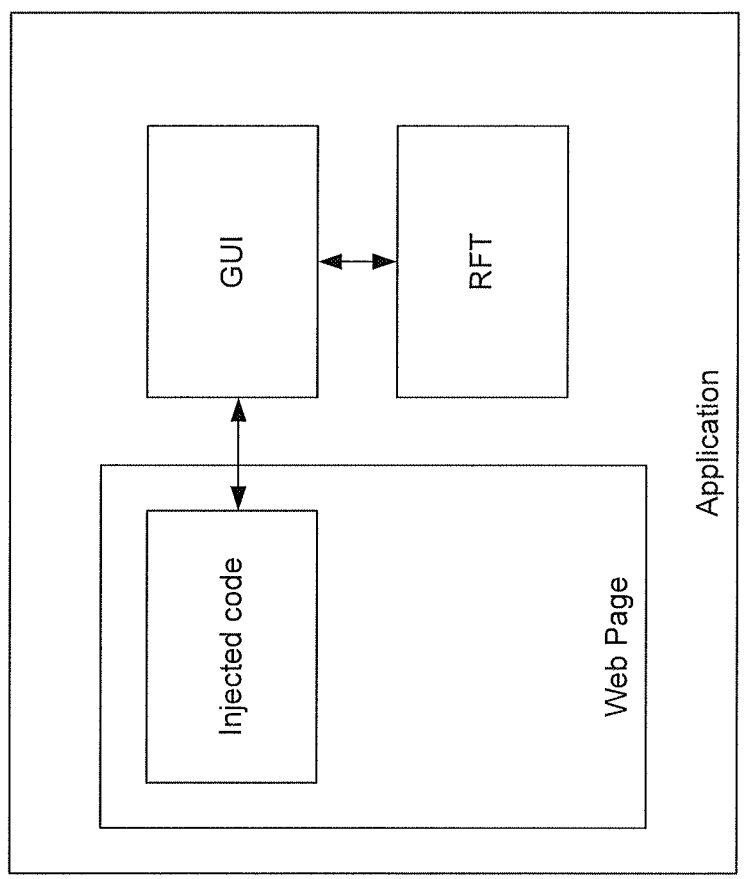
FIG. 12 is a schematic illustration of architecture of a reading fluency training system for a mobile device, according to an embodiment.

In some embodiments, the reading fluency training system described herein can be implemented in a mobile platform. In such embodiments, the SRE and other associated applications of the reading fluency training system can be hosted and executed on a mobile device such as, for example, a tablet or smart phone. In such embodiments, the architecture of the reading fluency training system can be inverted from that for a non-mobile platform (e.g., a web browser application executed at a desktop computer). The architecture for a mobile device can be different from the web browser architecture shown and described with respect to FIG. 3, where the application code (e.g., the RFT 330, the GUI 320) is injected into a web browser (e.g., the web browser 300). As shown in FIG. 12, in an architecture for a mobile device, the application for the reading fluency training system can be executed at the mobile device to present the web page. Thus, the RFT (reading fluency training module) is not inserted into the application code for presenting the web page.

Specifically, for a mobile device to host and execute a mobile application for the reading fluency training system described herein, the application code for the mobile application includes a web browser component that is configured to present a web page on the mobile device. After the mobile application is launched to present a web page, the web page can include, for example, a "Read Page" button (e.g., without the step of injecting a bookmarklet). In response to selecting the "Read Page" button, code (e.g., JavaScript code) associated with executing the reading fluency training system can be injected into the web browser component. The code can be executed in context of the web page, and thus the mobile application begins initialization. The initialization process for the mobile application is different from that described for the non-mobile platform (shown and described with respect to FIG. 4) in that (1) after language identification (e.g., similar to step 422 in FIG. 4) and defining of a mapping of character positions to DOM elements (e.g., similar to step 424 in FIG. 4), page information (e.g., as a result of text processing on the page content) can be passed out from the web browser component to the mobile application; (2) based on the page information passed from the web browser component, the SRE can be instantiated with the identified language and the configured user settings (e.g., similar to step 426 in FIG. 4), and audio can be prepared for streaming at or downloaded to the mobile application (e.g., similar to step 430 in FIG. 4); and (3) as both the SRE being instantiated and the audio being available, the mobile application is ready to be executed for tracking spoken words.

In some embodiments, the reading fluency training system described herein can be implemented using alternative visualization and highlighting methods. For example, alternative programming languages and visualization methods such as Adobe Flash can be used to perform on-screen visual highlighting by incorporating computer speech-recognition-based reading tracking. Specifically, the discovered text document can be rendered as "rich text" and the text highlighting can be manipulated using the Adobe Flash text API.

While described herein with respect to FIGS. 1 and 2 as a client device (e.g., the client device 120 in FIG. 1, the client device 200 in FIG. 2) performing a portion of the functions of a reading fluency training system (e.g., the reading fluency training system 100 in FIG. 1) and a server device (e.g., the server device 160 in FIG. 1) performing another portion of the functions, in other embodiments, one or more of the functions can be performed at a different location from that described herein. For example, language identification can be performed at the client device instead of the server device. Language identification is made based on the sequences of character bytes and their respective Unicode code ranges found in the extracted article text. One or more acoustic models and/or pronunciation lexicons can be stored at the client device prior to language identification such that the appropriate acoustic model(s) and/or pronunciation lexicon(s) can be easily and locally accessed after language identification without having to, for example, download the appropriate acoustic model(s) and/or pronunciation lexicon(s) from the server device. For another example, text extraction and/or analyzing can be performed at the client device, the server device, or a device of a third party (e.g., the server device 150 in FIG. 1).

While described herein with respect to FIGS. 2, 7 and 13 as the reading fluency training module 230 being instantiated at the client device 200 using a bookmarklet, in other embodiments, a reading fluency training module can be instantiated at a client device in any other suitable method. Specifically, the reading fluency training module can be installed at the client device without using a network connection. For example, the reading fluency training module can be installed from a CD (compact disc), a USB (universal serial bus) flash drive, a memory stick or other type of portable memory device. In some of such embodiments, the reading fluency training module can be instantiated at the client device in a method similar to performing a software installation process.

While shown and described with respect to FIG. 2 as the SRE 260 including the reading tracking module 261 and the text processing module 262, in other embodiments, functions performed by other modules excluded from the SRE 260 in FIG. 2 can be associated with or support the speech recognition function performed by the SRE 260. For example, visual highlighting (e.g., performed by the visual highlighting module 237) and feedback generation (e.g., performed by the feedback module 239) can be part of speech recognition, thus the corresponding modules can be included within the SRE.

While shown and described herein as readable textual content being presented in a web browser, in other embodiments, other display applications can be used to present readable text. In such embodiments, the reading fluency training system described herein can be modified accordingly to be executed with the other display applications appropriately. For example, an article can be presented in an HTML-based word processing application executed inside of a web browser (e.g., Google Docs) by opening a document. In some embodiments, the article can be presented in other word processing applications (e.g., Microsoft™ Word). The reading fluency training system can be injected into or embedded within application code of these word processing applications in a similar method as described herein. Furthermore, the reading fluency training system can be executed to visually highlight text in these word processing applications as audio of the text being played or spoken words of the text being produced by a user.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Where methods described above indicate certain events occurring in certain order, the ordering of certain events may be modified. Additionally, certain of the events may be performed concurrently in a parallel process when possible, as well as performed sequentially as described above. Any portion of the apparatus and/or methods described herein may be combined in any combination, except mutually exclusive combinations. The embodiments described herein can include various combinations and/or sub-combinations of the functions, components, and/or features of the different embodiments described.

What is claimed is:

1. A non-transitory processor-readable medium storing code representing instructions to be executed by a processor, the code comprising code to cause the processor to:

receive a first request from a user of a client device, the first request being to initiate a speech recognition engine for a first web page displayed at the client device;

download, in response to the first request and from a server associated with a first party, the speech recognition engine to the client device;

analyze, using the speech recognition engine and in response to the first request, content of the first web page including text in a first identified language to produce first analyzed content based on the first identified language, the content of the first web page being received from a server associated with a second party different from the first party;

send a first signal, the first signal to cause the client device to present the first analyzed content at the client device;

receive a second request, the second request being to initiate the speech recognition engine for a second web page displayed at the client device;

analyze, using the speech recognition engine and in response to the second request, content of the second web page including text in a second identified language to produce second analyzed content based on the second identified language, the content of the second web page being received from a server associated with a third party different from the first party and the second party; and send a second signal, the second signal to cause the client device to present the second analyzed content at the client device.

2. The non-transitory processor-readable medium of claim 1, wherein the code to cause the processor to download includes code to cause the processor to:

download, via a network and into a browser module at the client device, the speech recognition engine using a bookmarklet, the browser module configured to present the first web page at the client device.

3. The non-transitory processor-readable medium of claim 1, wherein the code to cause the processor to download includes code to cause the processor to:

download, via a network and into a browser module at the client device, the speech recognition engine using a bookmarklet such that the first request includes an instruction to initiate the bookmarklet when the first web page is presented by the browser module.

4. The non-transitory processor-readable medium of claim 1, wherein the code to cause the processor to analyze content of the first web page is not executed outside the client device.

5. The non-transitory processor-readable medium of claim 1, wherein the speech recognition engine is not executed at the server associated with the first party.

6. The non-transitory processor-readable medium of claim 1, wherein the server associated with the first party is remote from the client device and the server associated with the second party.

7. The non-transitory processor-readable medium of claim 1, wherein the content of the first web page includes text associated with audio in the first identified language, the code to cause the processor to analyze content of the first web page including code to cause the processor to map a set of spoken words from the audio of the first web page to a set of textual words from the text of the first web page such that the first signal is configured to cause the client device to visually highlight, at a display screen of the client device, each word from the set of textual words when an associated spoken word from the set of spoken words is output at an audio output device associated with the client device.

8. The non-transitory processor-readable medium of claim 1, wherein the speech recognition engine utilizes an acoustic model and a pronunciation lexicon for the first identified language to analyze the content of the first web page.

9. The non-transitory processor-readable medium of claim 1, wherein the code to cause the processor to analyze content of the first web page is not executed prior to the first request.

10. A method, comprising:
receiving, at a speech recognition engine on a client device, content of a first web page in response to a first request at the client device to execute the speech recognition engine, the content of the first web page including text in a first identified language, the first web page being presented to the user on a display screen of the client device;
determining, via the speech recognition engine, a set of character indices related to the text of the first web page when the first web page is presented at the client device;
mapping, via the speech recognition engine, a first set of spoken words to a set of textual words in the text of the first web page based on the set of character indices related to the text of the first web page, the first set of spoken words being associated with the content of the first web page;
sending a signal to cause the client device to visually highlight, on the display screen presenting the first web page, each word from the set of textual words in the text of the first web page when an associated spoken word from the first set of spoken words is output at an audio device associated with the client device;
receiving, at the speech recognition engine, content of a second web page in response to a second request at the client device to execute the speech recognition engine, the content of the second web page including text in a second identified language, the second web page being presented on the display screen of the client device;
determining, via the speech recognition engine, a set of character indices related to the text of the second web page when the second web page is presented at the client device;
mapping, via the speech recognition engine, a second set of spoken words to a set of textual words in the text of the second web page based on the set of character indices related to the text of the second web page, the second set of spoken words being associated with the content of the second web page; and
sending a signal to cause the client device to visually highlight, on the display screen presenting the second web page, each word from the set of textual words in the text of the second web page when an associated spoken word from the second set of spoken words is output at the audio device.

11. The method of claim 10, wherein the mapping the first set of spoken words occurs when the first web page is presented at the client device.

12. The method of claim 10, wherein each character index from the set of character indices related to the text of the first web page is a plain text character index, the method further comprising:
defining a data structure configured to map the set of character indices related to the text of the first web page to a set of Document Object Model (DOM) element indices associated with the first web page.

13. The method of claim 10, wherein the mapping the first set of spoken words includes identifying, via the speech recognition engine, each spoken word from the first set of spoken words as that spoken word is output at or produced by the audio device.

14. The method of claim 10, wherein the audio device is an audio input device, the sending a signal to cause the client device to visually highlight each word from the set of textual words in the text of the first web page includes sending the signal to cause the client device to visually highlight, on the display screen presenting the first web page, each word from the set of textual words in the text of the first web page when the user produces an associated spoken word from the first set of spoken words using the audio device.

15. A method, comprising:
receiving a first request from a user of a client device, the first request being a request to execute, at the client device, a speech recognition engine for a first web page when the first web page is displayed at the client device, the first web page hosted by a server associated with a first party, the first web page including text in a first language;
receiving, at the speech recognition engine, a first audio file from a database maintained by a second party in response to the receiving the first request, the first audio file being linked to the first web page by the database and including a set of spoken words in the first language corresponding, at least in part, to the text of the first web page;
sending a signal to cause the client device to output an audio recording from the first audio file as the speech recognition engine processes, at the client device, the text of the first web page and the first audio file;
receiving a second request from the user, the second request being a request to execute, at the client device the speech recognition engine for a second web page when the second web page is displayed at the client device, the second web page hosted by a server associated with a third party, the second web page including text in a second language different from the first language;
receiving, at the speech recognition engine, a second audio file from the database and in response to receiving the second request, the second audio file being linked to the second web page by the database and including a set of spoken words in the second language corresponding, at least in part, to the text of the second web page; and
sending a signal to cause the client device to output an audio recording from the second audio file as the speech recognition engine processes, at the client device, the text of the second web page and the second audio file.

16. The method of claim 15, further comprising:

sending a signal to cause the client device to visually highlight each word of the text of the first web page that corresponds to a spoken word from the first audio file when that spoken word is output from an audio output device associated with the client device.

17. The method of claim 15, wherein the first party is different from and not affiliated with the second party or the third party.

18. The method of claim 15, wherein the user is a first user, the set of spoken words in the first audio file is spoken by a second user associated with the second party when the first web page is presented to the second user.

19. The method of claim 15, wherein the receiving the first request, the receiving the first audio file and the sending the signal to cause the client device to output the audio recording from the first audio file occur when the first web page is presented via a browser module on the client device.

\* \* \* \* \*